US011522652B2

(12) United States Patent
Jung et al.

(10) Patent No.: US 11,522,652 B2
(45) Date of Patent: Dec. 6, 2022

(54) METHODS AND DEVICES FOR TRANSMITTING DEVICE CAPABILITY INFORMATION

(71) Applicant: Lenovo (Singapore) PTE. LTD., New Tech Park (SG)

(72) Inventors: Hyejung Jung, Northbrook, IL (US); Vijay Nangia, Woodridge, IL (US); Prateek Basu Mallick, Oberursel (DE); Ebrahim MolavianJazi, Lincolnwood, IL (US); Ravi Kuchibhotla, Chicago, IL (US); Joachim Loehr, Wiesbaden (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 171 days.

(21) Appl. No.: 16/940,227

(22) Filed: Jul. 27, 2020

(65) Prior Publication Data
US 2020/0358574 A1 Nov. 12, 2020

Related U.S. Application Data

(63) Continuation of application No. 16/128,453, filed on Sep. 11, 2018, now Pat. No. 10,735,162.
(Continued)

(51) Int. Cl.
*H04L 5/00* (2006.01)
*H04B 7/08* (2006.01)
(Continued)

(52) U.S. Cl.
CPC ........... *H04L 5/0048* (2013.01); *H04B 7/063* (2013.01); *H04B 7/0617* (2013.01);
(Continued)

(58) Field of Classification Search
CPC ... H04L 5/0023; H04L 5/0048; H04L 5/0091; H04B 7/0617; H04B 7/0628;
(Continued)

(56) References Cited

U.S. PATENT DOCUMENTS

2011/0105059 A1 5/2011 Gaal et al.
2012/0147755 A1* 6/2012 Chen ................ H04W 52/0216
370/242
(Continued)

FOREIGN PATENT DOCUMENTS

EP 3185449 A1 6/2017

OTHER PUBLICATIONS

LG Electronics, "Consideration on UL power control process for NR", 3GPP TSG RAN WG1 Meeting #90 R1-1713223, Aug. 21-25, 2017, pp. 1-6.
(Continued)

*Primary Examiner* — Melanie Jagannathan
(74) *Attorney, Agent, or Firm* — Kunzler Bean & Adamson

(57) ABSTRACT

Apparatuses, methods, and systems are disclosed for transmitting device capability information. The method includes operating a device with multiple antenna port groups for communication between the device and a network. The method includes transmitting, by the device, device capability information to the network. The device capability information includes a number of antenna port groups of the multiple antenna port groups, a number of antenna ports for each of the antenna port groups, a maximum number of supported spatial layers for each of the antenna port groups, or some combination thereof.

20 Claims, 10 Drawing Sheets

Related U.S. Application Data

(60) Provisional application No. 62/557,037, filed on Sep. 11, 2017.

(51) Int. Cl.
*H04B 7/06* (2006.01)
*H04W 8/22* (2009.01)
*H04L 1/18* (2006.01)
*H04W 16/28* (2009.01)
*H04W 24/10* (2009.01)
*H04W 72/04* (2009.01)
*H04W 56/00* (2009.01)
*H04W 52/24* (2009.01)
*H04W 52/36* (2009.01)
*H04W 52/42* (2009.01)
*H04W 52/14* (2009.01)

(52) U.S. Cl.
CPC ......... *H04B 7/0628* (2013.01); *H04B 7/0695* (2013.01); *H04B 7/088* (2013.01); *H04L 1/1854* (2013.01); *H04L 5/0023* (2013.01); *H04L 5/0091* (2013.01); *H04W 8/22* (2013.01); *H04W 16/28* (2013.01); *H04W 24/10* (2013.01); *H04W 56/001* (2013.01); *H04W 72/046* (2013.01); *H04B 7/0874* (2013.01); *H04W 52/146* (2013.01); *H04W 52/245* (2013.01); *H04W 52/365* (2013.01); *H04W 52/42* (2013.01)

(58) Field of Classification Search
CPC ..... H04B 7/063; H04B 7/0695; H04W 16/28; H04W 24/10; H04W 56/001; H04W 72/046

See application file for complete search history.

(56) References Cited

U.S. PATENT DOCUMENTS

| | | | |
|---|---|---|---|
| 2012/0164952 A1* | 6/2012 | Lee | H04W 24/08 455/67.11 |
| 2013/0286960 A1 | 10/2013 | Li et al. | |
| 2014/0185481 A1 | 7/2014 | Seol et al. | |
| 2014/0348005 A1* | 11/2014 | Futaki | H04W 64/006 370/242 |
| 2015/0078272 A1 | 3/2015 | Kim et al. | |
| 2017/0311189 A1* | 10/2017 | Almalfouh | H04B 17/336 |
| 2018/0042027 A1 | 2/2018 | Chao | |
| 2018/0049053 A1* | 2/2018 | Kaikkonen | H04W 24/08 |
| 2018/0269962 A1* | 9/2018 | Liu | H04W 72/082 |
| 2019/0053109 A1* | 2/2019 | Tambaram Kailasam | H04W 24/10 |
| 2019/0081753 A1 | 3/2019 | Jung et al. | |
| 2019/0089579 A1* | 3/2019 | Sang | H04W 76/27 |
| 2019/0132778 A1* | 5/2019 | Park | H04B 17/309 |
| 2019/0200249 A1* | 6/2019 | Yoon | H04W 72/042 |
| 2019/0289510 A1* | 9/2019 | Rugeland | H04W 36/0069 |
| 2019/0289573 A1* | 9/2019 | Hwang | H04W 36/06 |
| 2019/0327784 A1* | 10/2019 | Tarimala | H04W 72/0413 |
| 2019/0357064 A1* | 11/2019 | Hosseini | H04W 24/04 |
| 2020/0028545 A1* | 1/2020 | Koskela | H04W 76/15 |
| 2020/0196216 A1* | 6/2020 | Hui | H04W 36/08 |

OTHER PUBLICATIONS

CMCC, "Discussion on NR power control and sharing", 3GPP TSG RAN WG1 Meeting #90 R1-1713852, Aug. 21-25, 2017, pp. 1-4.
Mediatek Inc. "Discussion on Radio Link Monitoring", 3GPP TSG RAN WG1 Meeting #90 R1-1714269, Aug. 21-25, 2017, pp. 1-3.
Ericsson, "DL beam indication for periodic and aperiodic reference signals", 3GPP TSG-RAN WG1 #90 R1-1714291, Aug. 21-25, 2017, pp. 1-7.
Ericsson, "Mechanism to recover from beam failure", 3GPP TSG-RAN WG1 #90 R1-1714293, Aug. 21-25, 2017, pp. 1-11.
Samsung, "On BPL Update Procedure", 3GPP TSG RAN WG1 NR #90 R1-1714528, Aug. 21-25, 2017, pp. 1-3.
ZTE, "Radio Link Monitoring in NR", 3GPP TSG RAN WG1 Meeting #90 R1-1712070, Aug. 21-25, 2017, pp. 1-6.
3GPP, "3rd Generation Partnership Project; Technical Specification Group Radio Access Network; Study on New Radio Access Technology Physical Layer Aspects (Release 14)", 3GPP TR 38.802 V14.0 0, Mar. 2017, pp. 1-143.
Qualcomm, "Tagging and indication of DL beams", 3GPP TSG-RAN WG1 #90 R1-1713400, Aug. 21-25, 2017, pp. 1-9.
Nokia, Alcatel-Lucent Shanghai Bell, "On beam grouping and reporting", 3GPP TSG-RAN WG1 Meeting #89, R1-1708907, May 15-19, 2017, pp. 1-16.
Guangdong Oppo Mobile Telecom, "Uplink power control for NR", 3GPP TSG RAN WG1 NR Ad-Hoc#2, R1-1710174, Jun. 27-30, 2017, pp. 1-4.
Asustek, "Control of UE beamforming in RCC_Connected", 3GPP TSG-RAN WG2 Meeting #99, R2-1709324, Aug. 21-25, 2017, pp. 1-2.
Zte et al., "Discussion on UL power control for NR", 3GPP TSG RAN WG1 Meeting #88bis R1-1704418. Apr. 3-7, 2017, pp. 1-3.
LG Electronics, "Discussion on uplink power control for NR", 3GPP TSG RAN WG1 NR Ad-Hoc#2 R1-1710356, Jun. 27-30, 2017, pp. 1-6.
AT&T, "Beam Failure Events and Criteria for Declaring Radio Link Failure", 3GPP TSG-RAN WG2 #99 R2-1708205, Aug. 21-25, 2017, p. 1-4.
Catt, Catr, "Beam Recovery and FLF", 3GPP TSG-RAN WG2 Meeting #99 R2-1707892, Aug. 21-25, 2017, pp. 1-4.
Interdigital, Inc., "On Remaining Details of Beam Failure Recovery", 3GPP TSG RAN WG1 Meeting #90 R1-1714142, Aug. 21-25, 2017, pp. 1-6.
VIVO, "RLM / RLF in NR", 3GPP TSF-RAN WG2 Meeting #99, R2-1708417, Aug. 21-25, 2017, pp. 1-5.

* cited by examiner

METHODS AND DEVICES FOR TRANSMITTING DEVICE CAPABILITY INFORMATION

CROSS-REFERENCE TO RELATED APPLICATIONS

This application is a continuation of U.S. patent application Ser. No. 16/128,453 filed on Sep. 11, 2018 which claims priority to U.S. Patent Application Ser. No. 62/557,037 entitled "RADIO LINK MONITORING" and filed on Sep. 11, 2017 for Hyejung Jung, all of which are incorporated herein by reference in their entirety.

FIELD

The subject matter disclosed herein relates generally to wireless communications and more particularly relates to methods and devices for transmitting device capability information.

BACKGROUND

The following abbreviations are herewith defined, at least some of which are referred to within the following description: Third Generation Partnership Project ("3GPP"), Fifth Generation ("5G"), Positive-Acknowledgment ("ACK"), Angle of Arrival ("AoA"), Angle of Departure ("AoD"), Binary Phase Shift Keying ("BPSK"), Block Error Rate ("BLER"), Beam Failure Recovery Request ("BFRR"), Beam-Pair Link ("BPL"), Clear Channel Assessment ("CCA"), Cyclic Delay Diversity ("CDD"), Cyclic Prefix ("CP"), Cyclical Redundancy Check ("CRC"), CSI-RS Resource Indicator ("CRI"), Channel State Information ("CSI"), Common Search Space ("CSS"), Discrete Fourier Transform Spread ("DFTS"), Downlink Control Information ("DCI"), Downlink ("DL"), Demodulation ("DM"), Downlink Pilot Time Slot ("DwPTS"), Enhanced Clear Channel Assessment ("eCCA"), Enhanced Mobile Broadband ("eMBB"), Evolved Node B ("eNB"), Enhanced Vehicle-to-Everything ("eV2X"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), In-Sync ("IS"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Master Cell Group ("MCG"), Modulation Coding Scheme ("MCS"), Measurement Indicator ("MI"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Non-Zero Power ("NZP"), Orthogonal Frequency Division Multiplexing ("OFDM"), Out-of-Sync ("OOS"), Power Angular Spectrum ("PAS"), Primary Serving Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Power Headroom Report ("PHR"), Physical Random Access Channel ("PRACH"), Physical Resource Block ("PRB"), Physical Resource Block Group ("PRG"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), QCL Reference Indicator ("QRI"), Quadrature Phase Shift Keying ("QPSK"), Radio Resource Control ("RRC"), Random Access Procedure ("RACH"), Random Access Response ("RAR"), Radio Access Technology ("RAT"), Radio Link Failure ("RLF"), Radio Link Monitoring ("RLM"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Secondary Cell Group ("SCG"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINK"), System Information Block ("SIB"), Synchronization Signal ("SS"), Supplemental Uplink ("SUL"), Timing Advance ("TA"), Transport Block ("TB"), Transport Block Size ("TBS"), Time-Division Duplex ("TDD"), Time Division Multiplex ("TDM"), Time Division Orthogonal Cover Code ("TD-OCC"), Transmit Power Control ("TPC"), Transmission and Reception Point ("TRP"), Time/Frequency Tracking RS ("TRS"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, device capability information may be transmitted. In such networks, the device capability information may be unknown.

BRIEF SUMMARY

Methods for transmitting device capability information are disclosed. Apparatuses and systems also perform the functions of the method. In one embodiment, the method includes operating a device with multiple antenna port groups for communication between the device and a network. In certain embodiments, the method includes transmitting, by the device, device capability information to the network. In such embodiments, the device capability information includes a number of antenna port groups of the multiple antenna port groups, a number of antenna ports for each of the antenna port groups, a maximum number of supported spatial layers for each of the antenna port groups, or some combination thereof.

One apparatus for transmitting device capability information includes a processor that operates the apparatus with multiple antenna port groups for communication between the apparatus and a network. In certain embodiments, the apparatus includes a transmitter that transmits device capability information to the network. In such embodiments, the device capability information includes a number of antenna port groups of the multiple antenna port groups, a number of antenna ports for each of the antenna port groups, a maximum number of supported spatial layers for each of the antenna port groups, or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
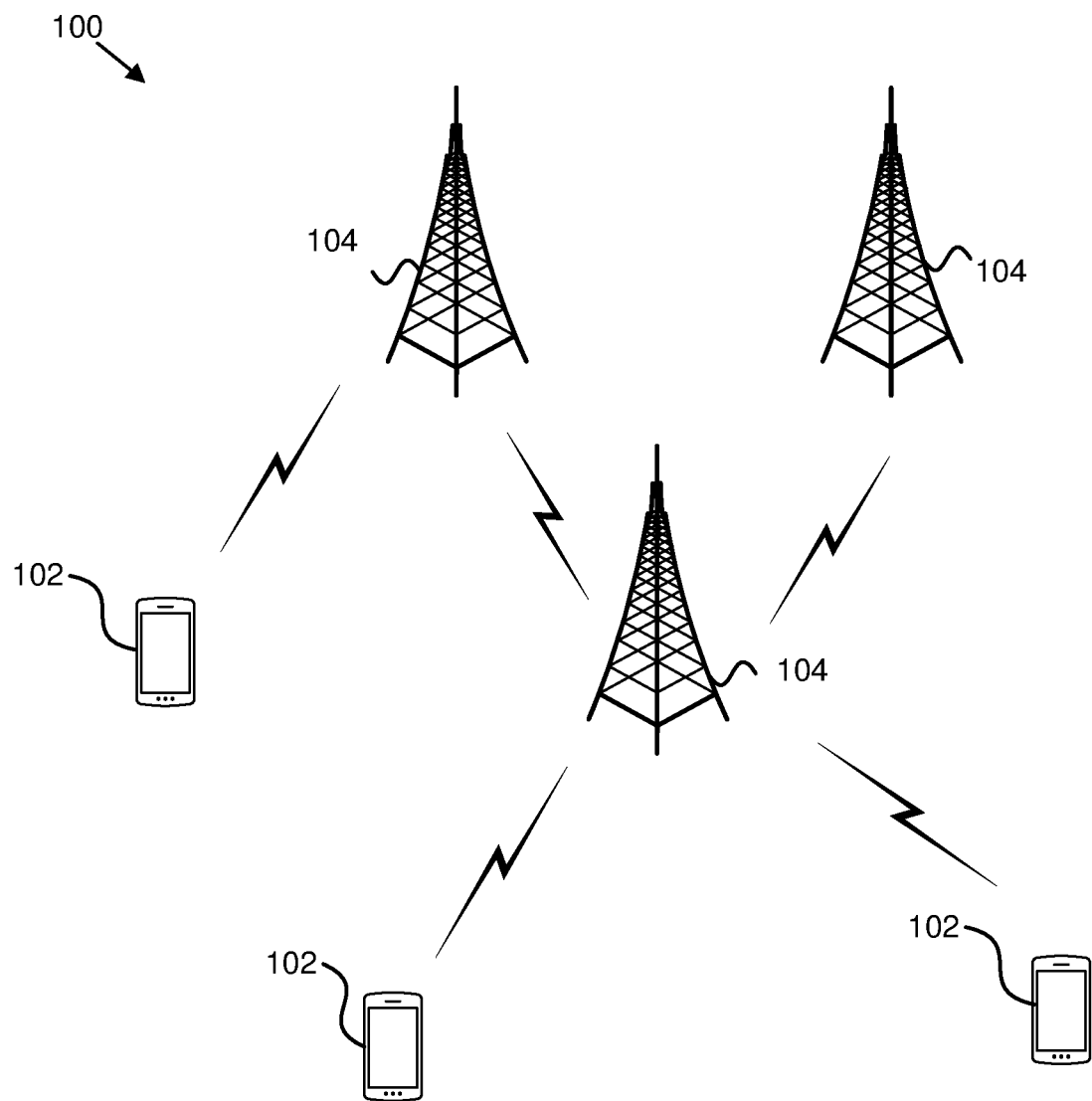
FIG. 1 is a schematic block diagram illustrating one embodiment of a wireless communication system for radio link monitoring.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for radio link monitoring. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may be used for radio link monitoring. In some embodiments, the remote unit 102 may be used for measuring a first set of reference signals for radio link monitoring. In certain embodiments, the remote unit 102 may be used for receiving an indication of a second set of reference signals for radio link monitoring. In various embodiments, the remote unit 102 may be used for resetting a counter in response to reception of the indication of the second set of reference signals. In some embodiments, the first set of reference signals is associated with a first set of downlink antenna ports, the second set of reference signals is associated with a second set of downlink antenna ports, and the first set of downlink antenna ports is different from the second set of downlink antenna ports.

In certain embodiments, a network unit 104 may be used for beam failure recovery. In some embodiments, the network unit 104 may be used for transmitting a first set of reference signals. In various embodiments, the network unit 104 may be used for transmitting an indication of a second set of reference signals. In such embodiments, the first set of reference signals is associated with a first set of downlink antenna ports, the second set of reference signals is associated with a second set of downlink antenna ports, and the first set of downlink antenna ports is different from the second set of downlink antenna ports. In certain embodiments, the network unit 104 may be used for transmitting an indication of at least one physical uplink control channel resource and at least one physical random access channel resource for receiving a beam failure recovery request. In such embodiments, each of the at least one physical uplink control channel resource and the at least one physical random access channel resource are associated with at least one downlink antenna port. In some embodiments, the network unit 104 may be used for receiving a beam failure recovery request. In various embodiments, the network unit 104 may be used for transmitting a response to the beam failure recovery request. In such embodiments, the response includes configuration information corresponding to the second set of reference signals.

Figure 2:
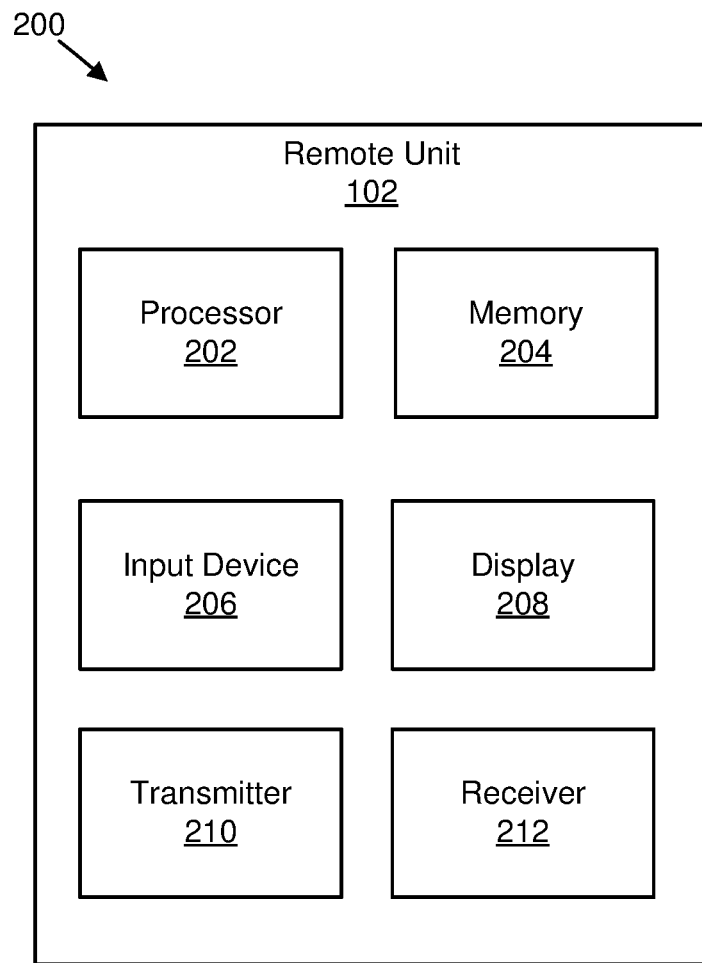
FIG. 2 is a schematic block diagram illustrating one embodiment of an apparatus that may be used for radio link monitoring.

FIG. 2 depicts one embodiment of an apparatus 200 that may be used for radio link monitoring. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 measures a first set of reference signals for radio link monitoring. In certain embodiments, the processor 202 resets a counter in response to reception of an indication of a second set of reference signals. In some embodiments, the first set of reference signals is associated with a first set of downlink antenna ports, the second set of reference signals is associated with a second set of downlink antenna ports, and the first set of downlink antenna ports is different from the second set of downlink antenna ports. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In certain embodiments, the receiver 212 receives an indication of a second set of reference signals for radio link monitoring. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
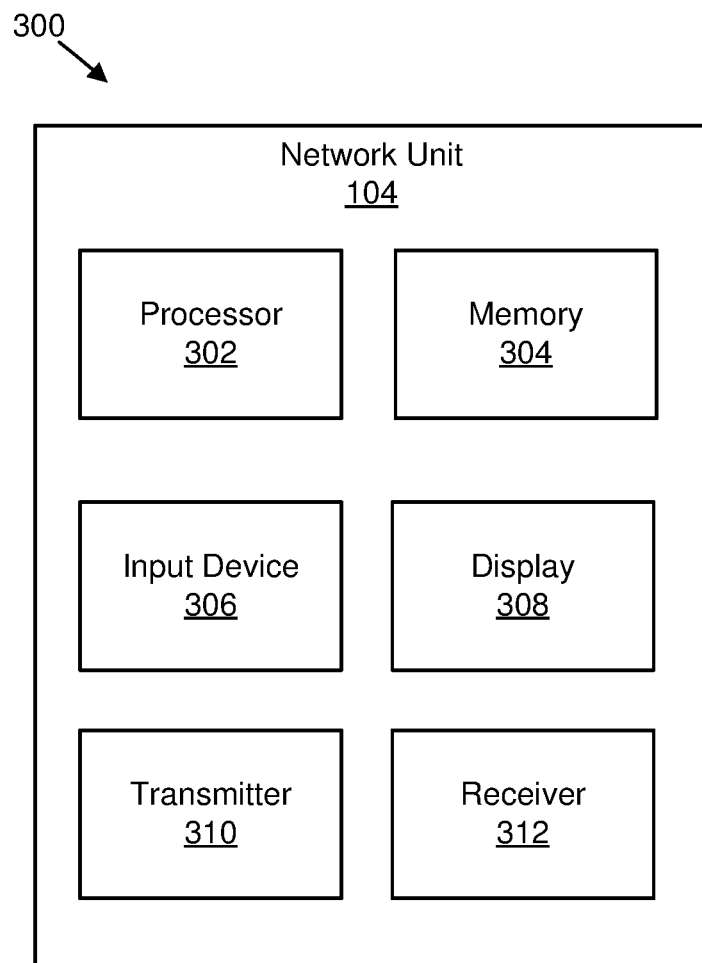
FIG. 3 is a schematic block diagram illustrating one embodiment of an apparatus that may be used for radio link monitoring.

FIG. 3 depicts one embodiment of an apparatus 300 that may be used for radio link monitoring. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310: transmits a first set of reference signals; transmits an indication of a second set of reference signals, wherein the first set of reference signals is associated with a first set of downlink antenna ports, the second set of reference signals is associated with a second set of downlink antenna ports, and the first set of downlink antenna ports is different from the second set of downlink antenna ports; and transmits an indication of at least one physical uplink control channel resource and at least one physical random access channel resource for receiving a beam failure recovery request, wherein each of the at least one physical uplink control channel resource and the at least one physical random access channel resource are associated with at least one downlink antenna port. In certain embodiments, the receiver 312 receives a beam failure recovery request. In some embodiments, the transmitter 310 transmits a response to the beam failure recovery request, and the response includes configuration information corresponding to the second set of reference signals.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, such as 5G RAT, a network may support both single beam and multi-beam based operations. In such embodiments, a UE (e.g., remote unit 102) may be configured with one or more RLM-RS resources in a PCell of an MCG and/or a PSCell of an SCG to evaluate radio link qualities of one or more serving beams. Moreover, each RLM-RS resource may be associated with one DL antenna port (e.g., an antenna port of an SS/PBCH block or a CSI-RS antenna port of a CSI-RS resource) and a UE may derive a cell-level radio link quality from the one or more RLM-RS resources.

In certain embodiments, the UE may assess radio link quality periodically (e.g., every radio frame, 10 millisecond ("ms")) by estimating RS quality (e.g., SINR) from measured RLM-RS (and additionally from measured interference measurement RS) and comparing the SINR estimates with threshold values (e.g., $Q_{in}$ and $Q_{out}$), which, for example, correspond to SINR values for 2% BLER and 10% BLER of hypothetical PDCCH, respectively. In some embodiments, if the SINR estimated over the last X ms (e.g., X=200) period is lower than the threshold value $Q_{out}$, Layer 1 of the UE may send an OOS indication to a higher layer (e.g., Layer 3). In such embodiments, if the Layer 3 receives a certain number of consecutive OOS indications, the UE may start an RLF timer. Moreover, if the SINR estimated over the last Y ms (e.g., Y=100) period is higher than the threshold value $Q_{in}$, the Layer 1 of the UE may send an IS indication to the Layer 3. Furthermore, before expiration of RLF timer, if the Layer 3 receives a certain number of consecutive IS indications, the RLF timer may stop. Otherwise, the UE may declare RLF in response to the RLF timer expiring. Since the UE counts a number of consecutive OOS indications to determine whether to start the RLF timer or not, the UE resets an OOS counter receiving upon an IS indication. Similarly, the UE counts a number of consecutive IS indications to determine whether to stop the RLF timer. Thus, the UE resets an IS counter receiving upon an OOS indication.

In certain embodiments, with multiple configured RLM-RS resources, OOS may be indicated if estimated link qualities (e.g., SINR) for all the configured RLM-RS resources are below the $Q_{out}$ threshold value. Furthermore, in some embodiments, IS may be indicated if the estimated link qualities on at least Z (e.g., Z=1 or 2) RLM-RS resources among all the configured RLM-RS resources are above the $Q_{in}$ threshold value. In various embodiments, BLER values to determine $Q_{in}$ and $Q_{out}$ threshold values may be set differently per UE or per application, depending on UE types and/or service requirements such as reliability and latency.

In some embodiments, a UE in a wireless network operated with multiple DL beams may: transmit a DL beam failure recovery request efficiently (e.g., with less cyclic prefix overhead and potentially with shorter transmission time) depending on deployment scenarios, where DL beams are transmitted from same and/or different locations, and UL synchronization status; perform radio link monitoring and handle radio link failure, interacting with Layer 1 beam management and/or beam recovery procedures.

In certain embodiments, a channel over which a symbol on an antenna port is conveyed can be inferred from the channel over which another symbol on the same antenna port is conveyed.

In certain embodiments, for DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG as described in clause 5.1.2.3 of [3GPP TS 38.214].

In various embodiments, two antenna ports are said to be QCL if large-scale properties of a channel over which a symbol on one antenna port is conveyed can be inferred from the channel over which a symbol on the other antenna port is conveyed. In some embodiments, the large-scale properties may include one or more of: delay spread, Doppler spread, Doppler shift, average gain, average delay, and/or spatial RX parameters. Two antenna ports may be quasi-located with respect to a subset of the large-scale properties. Spatial Rx parameters may include one or more of: AoA, Dominant AoA, average AoA, angular spread, PAS of AoA, average AoD, PAS of AoD, transmit and/or receive channel correlation, transmit and/or receive beamforming, and/or spatial channel correlation.

As used herein, an "antenna port" may be a logical port that may correspond to a beam (e.g., resulting from beamforming) or may correspond to a physical antenna on a device. In some embodiments, a physical antenna may map directly to a single antenna port in which an antenna port corresponds to an actual physical antenna. In certain embodiments, a set of physical antennas, a subset of physical antennas, an antenna set, an antenna array, and/or an antenna sub-array may be mapped to one or more antenna ports after applying complex weights, a cyclic delay, or both to the signal on each physical antenna. In various embodiments, a physical antenna set may have antennas from a single module or panel, or from multiple modules or panels. In some embodiments, weights may be fixed as in an antenna virtualization scheme, such as CDD. In certain embodiments, a procedure used to derive antenna ports from physical antennas may be specific to a device implementation and transparent to other devices.

In various embodiments, DL TX antenna ports may correspond to antenna ports of a single CSI-RS resource, or antenna ports of different CSI-RS resources (e.g., a first subset of DL TX antenna ports corresponding to a first CSI-RS resource, and a second subset of DL TX antenna ports corresponding to a second CSI-RS resource).

In some embodiments, a DL TX antenna port may be associated with one or more SS blocks in which each SS block has a corresponding SS block index. In certain embodiments, an antenna port associated with a first SS block (e.g., a first SS block index) may correspond to a first DL TX beam (e.g., beamforming pattern), and an antenna port associated with a second SS block (e.g., a second SS block index) may correspond to a second DL TX beam. In various embodiments, depending on an SS block, an antenna port may correspond to different DL TX beams (e.g., a first DL TX beam or a second DL TX beam). In such embodiments, the first DL TX beam may be different than the second DL TX beam. Moreover, the first SS block may be different than the second SS block which may result in the first SS block index being different than the second SS block index. In one embodiment, the first SS block may be transmitted at a first time instance and the second SS block may be transmitted at a second time instance. In another embodiment, the first and second SS block transmission instances may overlap and, in some embodiments, the first and second SS block transmission instances may completely overlap. In certain embodiments, a UE may assume that any transmission instance of an SS block with a same SS block index may be transmitted on a same antenna port. In various embodiments, a UE may not assume that a channel over which a first SS block with a first SS block index is conveyed can be inferred from the channel over a second SS block with a second SS block index (e.g., different than the first SS block index) is conveyed even if the first and second SS blocks are transmitted on the same antenna port.

In some embodiments, a DL TX antenna port may be associated with one or more CSI-RS resources. In various embodiments, an antenna port associated with a first CSI-RS resource (e.g., a first CSI-RS resource index) may correspond to a first DL TX beam (e.g., beamforming pattern), and an antenna port associated with a second CSI-RS resource (e.g., a second CSI-RS resource index) may correspond to a second DL TX beam. In certain embodiments, depending on a CSI-RS resource, an antenna port may correspond to different DL TX beams (e.g., a first DL TX beam or a second DL TX beam). In such embodiments, the first DL TX beam may be different than the second DL TX beam. Moreover, the first CSI-RS resource may be different than the second CSI-RS resource thereby resulting in the first CSI-RS resource index being different than the second CSI-RS resource index. In one embodiment, a first CSI-RS resource may be transmitted at a first time instance and a second CSI-RS resource may be transmitted at a second time instance. In another embodiment, first and second CSI-RS resource transmission instances may overlap and, in some embodiments, the first and second CSI-RS resource transmission instances may completely overlap. In certain embodiments, a UE may assume that any transmission instance of a CSI-RS resource with the same CSI-RS resource index is transmitted on the same antenna port. In some embodiments, a UE may not assume that a channel over which a first CSI-RS resource with a first CSI-RS resource index is conveyed can be inferred from the channel over a second CSI-RS resource with a second CSI-RS resource index (e.g., different than the first CSI-RS resource index) is conveyed even if the first and second CSI-RS resource are transmitted on the same antenna port.

In various embodiments, a UE may transmit a BFRR on a PUCCH in which the PUCCH is on an uplink associated with a new candidate serving DL antenna port, if the UE can assume that it is UL synchronized for the uplink associated with the new candidate serving DL antenna port. In one embodiment, a UE may assume UL synchronization if the UE selects a new candidate serving DL antenna port quasi-co-located with a current serving DL antenna port in terms of propagation delay (e.g., average delay, delay spread), and/or Doppler parameters (e.g., Doppler spread and/or Doppler shift) and if the UE maintains up-to-date UL timing information (e.g., UL timing advance value) for an uplink associated with the current serving DL antenna port. In such an embodiment, for transmitting PUCCH carrying a BFRR, the UE may use a TA value for an uplink associated with a current serving DL antenna port. In certain embodiments, a UE may transmit a BFRR on a PUCCH if the UE maintains a valid TA value for the uplink associated with the newly identified candidate serving DL antenna port. In various embodiments, both a new candidate serving DL antenna port and a current serving DL antenna port may be QCL with antenna ports of an RS such as TRS with respect to average delay, delay spread, Doppler shift, and/or Doppler spread.

In certain embodiments, a UE may transmit a BFRR on a PRACH if the UE cannot assume UL synchronization for an uplink associated with a new candidate serving DL antenna port. In one embodiment, a UE transmits a BFRR on a PRACH if a newly identified candidate serving DL antenna port is not quasi-co-located with a current serving DL antenna port (e.g., transmitted from a different network node or TRP), and if the UE is not UL synchronized for the uplink associated with the newly identified candidate serving DL antenna port.

In various embodiments, a UE may receive an indication of one or more PUCCH resources and one or more PRACH resources which may be used by the UE to transmit a beam failure recovery request. In such embodiments, each of the one or more PUCCH resources and the one or more PRACH resources may be associated with at least one DL antenna port, and the UE may identify the association between the configured PRACH and/or PUCCH resources and DL antenna ports based on implicit and/or explicit indication from a network entity (e.g., gNodeB). In some embodiments, the DL antenna ports associated with the one or more PUCCH resources are quasi-co-located with at least one of the current serving DL antenna ports (e.g., serving beams) in terms of propagation delay and/or Doppler parameters. In one embodiment, one or more PUCCH resources are associated with at least one of the current serving DL antenna ports. In certain embodiments, if a UE maintains two or more TA values for two or more DL antenna port groups (e.g., DL beam groups) in which each DL antenna port group is associated with one TA value, the UE may identify a TA value for each of the one or more configured PUCCH resources based on both the association between the configured PUCCH resources and the DL antenna ports and information on the two or more DL antenna port groups. In certain embodiments, a network entity may configure a UE with one or more PRACH resources for non-serving DL antenna ports and/or DL antenna ports which are not quasi co-located with any of the current serving DL antenna ports. In one embodiment, a PUCCH resource may include a time and frequency radio resource and optionally an orthogonal or quasi-orthogonal code. In another embodiment, a PRACH resource includes a time and frequency radio resource and a PRACH preamble.

In some embodiments, in response to a UE detecting a failure of all the serving DL antenna ports for all the serving PDCCHs and identifies at least one candidate serving DL antenna port for a new serving PDCCH, the UE may determine a resource to transmit a BFRR based on the identified candidate serving DL antenna port and its association with PUCCH resources and/or PRACH resources. In such embodiments, if the determined resource is a PUCCH resource, the UE may further identify a corresponding TA value among one or more TA values that it maintains and may transmit the BRFF with applying the identified TA value. In certain embodiments, if there is no valid TA value for the determined PUCCH resource (e.g., uplink not synchronized for some serving DL antenna ports), a UE may transmit a BFRR on the PRACH resource (e.g., contention-based random access). In various embodiments, when transmitting the BFRR on the PRACH resource, the UE may not apply any TA value other than a timing offset between UL and DL frames.

In some embodiments, a granularity of a TA command (e.g., in sec) received in response to PRACH transmissions by a UE is based on PRACH subcarrier spacing and PRACH sequence length used for the PRACH transmission (e.g., the PRACH transmission bandwidth). In such embodiments, the granularity of the TA command (e.g., in samples) may be based on the PRACH sequence length with the sampling period dependent on the PRACH subcarrier spacing.

In various embodiments, at least some serving DL antenna ports are associated with antenna ports on which serving control channels (e.g., UE-specific and common (cell or group-common) control channels) are monitored. In such embodiments, the association may be in terms of using the same antenna port or QCL relations between a serving DL antenna port and an antenna port on which a control channel is monitored.

In one embodiment, for new candidate beam identification or new candidate serving DL antenna port identification, a UE may be configured to use CSI-RS resource and/or SS-block antenna ports. For a CSI-resource, the UE may indicate a QCL relationship between antenna ports of NZP CSI-RS and antenna port of an SS-block (e.g., SS/PBCH block) with respect to one or more QCL parameters, such as spatial RX parameters. In some embodiments, if a CSI-RS resource is QCL with an SS-block, the UE may use the CSI-RS antenna ports for determination and/or identification of a new candidate serving DL antenna port, and on successful identification may transmit a BFRR on a PUCCH associated with the CSI-RS resource (and hence also associated with the new candidate serving DL antenna port). In various embodiments, if no CSI-RS resource is QCL with an SS-block, the UE may use the SS-block for determination and/or identification of a new candidate serving DL antenna port, and on successful identification may transmit a BFRR on a PRACH associated with an SS-block (and hence also associated with the new candidate serving DL antenna port).

In one embodiment, if a UE receives an indication for a new or updated set of RLM-RS resources in response to a UE's beam failure recovery request or during normal beam management operation (e.g., updating a set of serving beams or serving DL antenna ports or serving CSI-RS resources, or serving SS blocks that is QCL with the serving beams and/or DL antenna ports), Layer 1 (e.g., physical layer) of the UE may send a beam recovery (or beam update) success indication to Layer 3 (e.g., RRC layer). In certain embodiments, if there was at least one OOS indication sent to the Layer 3, the Layer 1 of a UE may further provide an aperiodic IS indication to the Layer 3 in response to receiving the new set of RLM-RS resources, which makes the UE avoid starting an RLF timer due to the previous OOS indications. In such embodiments, if the RLF timer has already been running at the UE, the UE may stop the RLF timer upon receiving the new or updated set of RLM-RS resources (and accordingly generating the aperiodic IS indication). In another embodiment, if the RLF timer has already been running at a UE, the UE may pause the RLF timer upon receiving a new set or updated set of RLM-RS resources (and accordingly the aperiodic IS indication) and evaluate the radio link quality based on the latest RLM-RS resources. In such embodiments, the timer may be stopped if a certain configured number of (periodic) in-sync indications (e.g., may be consecutive) are reported by the UE's physical layer within a certain time period (e.g., predetermined or configured), otherwise the RLF timer is re-started.

In certain embodiments, a UE may declare physical layer link failure (e.g., beam failure) and may send a beam failure recovery request, in response to: measuring UE-specifically configured CSI-RS resources and/or SS/PBCH block resources which are associated (i.e. spatially quasi-co-located) with serving control channels; detecting that qualities of all the serving control channels are lower than configured threshold values over a certain period of time; and identifying at least one candidate DL antenna port (e.g., DL beam). In another embodiment, a UE may send an event-triggered Layer 1 (e.g., beam) measurement report or event-triggered request for new RS configuration (e.g., for new beam sweeping) to a network entity, if qualities of a certain number of serving control channels are lower than the configured threshold values over a certain time duration, potentially spanning over multiple consecutive configuration instances (so that old and expired beam and/or RSs are also counted for triggering such an event). In some embodiments, the serving control channels for beam failure detection and beam management may be same as or partially overlapping with serving control channels for RLM. In one embodiment, the serving control channels for RLM may be a subset of the serving control channels for beam failure detection and beam management. In certain embodiments, a UE may monitor one or a few (e.g., 2 to 3) active DL beams for RLM and monitor a set of candidate beams (e.g., 8 beams) including the active DL beams for beam failure detection and recovery. For beam management, a UE may periodically scan SS/PBCH blocks and/or configured CSI-RS resources (e.g., 32 beams). For CSI-RS based RLM, a subset of beam management CSI-RS resources may be configured as the RLM RS resources.

In certain embodiments, after receiving a beam failure recovery request or an event-triggered Layer 1 measurement report, a network entity may re-configure a UE with new or updated sets of serving control channels (and serving beams) for beam failure detection and/or RLM, respectively, and new or updated sets of beam measurement RS resources and/or RLM-RS resources which are spatially quasi-co-located with the new sets of serving control channels with respect to spatial average gain, average delay, and/or Doppler parameters. In some embodiments, if a UE is successfully reconfigured with a new set of serving control channels for RLM and corresponding RLM-RS resources, previous OOS indications generated by failure of all the previous serving control channels may not make any further impact on RLF related procedure. Thus, in some embodiments, aperiodic IS indication may be necessary in response to reception of a new RLM-RS resource configuration if at least one OOS indication is reported or an RLF timer has been running. In one embodiment, a UE may receive a new RLM-RS resource configuration in a BFRR response message. In such an embodiment, the BFRR response message may be delivered in a PDSCH scheduled via a PDCCH associated with one of the new sets of serving control channels. Further, in certain embodiments, BFRR response messages may include a new configuration for one or more CSI-RS resources used for DL beam measurement and/or beam failure detection.

In another embodiment, if a UE receives an indication for new serving control channels (e.g., serving beams) for RLM and corresponding new RLM-RS resources in which a subset of new serving control channels and a corresponding subset of new RLM-RS resources may be part of previous serving control channels and previous RLM-RS resources, the UE may combine previous measurements with new measurements and generate combined link quality metrics for RLM evaluation of the subset of the new serving control channels (associated with the unchanged RLM-RS resources). In one embodiment, a UE may consistently report a first serving control channel with high RSRP for a while (based on periodic beam reporting), and may trigger a beam failure recovery procedure due to temporary blocking on the first serving control channel. In certain embodiments, with a successful beam recovery procedure, a UE may be re-configured with the first serving control channel (e.g., DL antenna port, beam) and a second serving control channel. In various embodiments, as long as a newly configured second serving control channel is in good condition, a UE may not report OOS. In some embodiments, if blocking in a first serving control channel goes away, the first serving control channel may also be used and may help a UE not to enter OOS or beam failure status. In certain embodiments, to assess radio link quality for a first serving control channel, a UE may combine previous measurements (e.g., measurements performed before completion of beam recovery procedure) with new measurements (e.g., measurement performed after beam recovery) within a predefined evaluation period. However, in various embodiments, to evaluate radio link quality for a second serving control channel, a UE may only use new measurements on a newly configured RLM-RS resource corresponding to the second serving control channel.

In some embodiments, Layer 1 of a UE may send to a higher layer an aperiodic OOS indication after 'N' number of beam recovery procedure failures (or 'N' number of beam recovery request transmission windows), and the UE running an RLF timer may declare RLF immediately after receiving the aperiodic OOS indication from the Layer 1. As may be appreciated, 'N' may be configurable by a network entity, depending on a propagation environment in a cell (e.g., cell-specific configuration), an application, and/or service types (e.g., UE-specific configuration). In one embodiment, 'N' may be set to one. In another embodiment, 'N' may be set to infinity (e.g., not supporting the aperiodic OOS indication).

In certain embodiments, an RLF timer is a network configured parameter that indicates a duration during which a gNodeB may tolerate a UE to be in an unreachable state. In various embodiments, a proper timer duration may be application-specific and/or deployment (e.g., frequency band, propagation environment) specific. In various embodiments, as long as an RLF timer is properly set, aperiodic indication based fast RLF declaration may not be necessary. In some embodiments, if a UE fails to find a new beam or fails to be configured with new serving control channels and new RLM-RS resources, the UE may continue to report OOS based on a current RLM RS and may retry new beam identification after some time, until an RLF timer expires. In such embodiments, the UE may avoid frequently going through RRC re-establishment procedures due to temporary problems in a radio link. However, for some applications and deployment cases, immediate actions after beam recovery failure to re-establish RRC connection with a different cell may be used for better user experience. In certain embodiments, it may be beneficial for flexible network and UE operations to make support of aperiodic OOS indication configurable via selection of the 'N' value.

In various embodiments, Layer 1 of a UE may send an aperiodic OOS indication to Layer 3 based on an indication of failure in a beam recovery procedure and may start to run a cell selection timer (e.g., T311) based on the aperiodic OOS indication. In some embodiments, a UE may start cell selection even before declaring RLF (e.g., while a RLF timer, such as T310, is still running) and attempts RRC connection re-establishment. In certain embodiments, (1) if beam recovery (in a source cell, i.e., in a current serving cell) succeeds but not a reestablishment, a UE may stay in the source cell; (2) if beam recovery (in the source cell) fails but a reestablishment succeeds, the UE re-establishes a connection with a target cell; (3) if both beam recovery and reestablishment succeed, the following may occur: (a) beam recovery before receiving a successful reestablishment message for which the UE provides an indication of successful beam recovery to the source cell (and the source cell provides an indication of successful beam recovery for the UE to a new target), (b) recovery after receiving a successful reestablishment message—this may not happen since the UE may stop monitoring a response from an old-source cell as soon as it receives the successful reestablishment message from the target cell, and the UE may go to the target cell; and (4) if both beam recovery and reestablishment fail, the UE may go to an idle state.

In one embodiment, a UE may differentiate a cause of RLF based on RLM IS and OOS threshold values and transmit information on the differentiated RLF cause to a network entity. In various embodiments, a UE may be configured with one or multiple (e.g., $Q_{in}$, $Q_{out}$) threshold values for IS and OOS evaluation at a given time, and each (e.g., $Q_{in}$, $Q_{out}$) pair may be associated with different BLER values for a hypothetical PDCCH. In addition, in some embodiments, there may be multiple 'RLF cause' values related to radio link problems that may be predefined, each of which corresponds to one pair of IS and/or OOS threshold values. In certain embodiments, if a UE is configured with multiple pairs of IS and/or OOS threshold values and the UE declares RLF due to radio link problems, the UE may set the RLF cause to a RLF cause value associated with the least stringent pair of IS and/or OOS threshold values among expired RLF timers.

In one embodiment, a UE may be configured with two pairs of threshold values in response to the UE having multiple active applications of two different service types (e.g., eMBB and URLLC). In some embodiments, because different threshold values may lead to different IS or OOS indications, a UE may maintain a separate IS and/or OOS counter and RLF timer per pair of threshold values (e.g., $Q_{in}$, $Q_{out}$), for example, PCell RLF timer T310-1 for (e.g., $Q1_{in}$, $Q1_{out}$) and PCell RLF timer T310-2 for (e.g., $Q2_{in}$, $Q2_{out}$), in which BLER for $Q1_{in}$ is greater than BLER for $Q2_{in}$ and BLER for $Q1_{out}$ is greater than BLER for $Q2_{out}$. In certain embodiments, if a UE has expiry of both T310-1 and T310-2 RLF timers simultaneously, the UE may set an RLF cause with the least stringent pair of IS and/or OOS threshold values (e.g., $Q1_{in}$, $Q1_{out}$). In various embodiments, a UE may set an information element 'rlf-Cause' in an UEInformationResponse message to 't310-1-Expiry'. In some embodiments, a UE may have to declare RLF in a cell according to the most stringent pair of threshold values (e.g., $Q2_{in}$, $Q2_{out}$), but may still be able to maintain an RRC connection with the cell according to the other pair of threshold values (e.g., $Q1_{in}$, $Q1_{out}$). In this case, a UE may set an information element 'rlf-Cause' in an UEInformationResponse message to 't310-2-Expiry'. In various embodiments, a UE's recording and reporting of a differentiated level of radio link problems for a cell may be useful for service provisioning by a network entity, especially when the UE returns to a source PCell for RRC connection reestablishment.

In one embodiment, for URLLC applications, RLM IS and OOS threshold values may be defined to correspond to BLER values of a hypothetical PDSCH transmission assuming that DM-RS ports of PDSCH are QCL with the RLM-RS associated with a serving beam or serving DL antenna port.

In various embodiments, a UE may detect that all serving DL control beams are failed (e.g., with respect to a SINR criterion), but no alternative beams can be identified (e.g., the RSRP measurement values for all other monitored beams are also low or less than a RSRP threshold value). In such cases, a beam failure may not be declared by a UE and the UE may simply wait until a new beam may be identified among the current beams under monitoring; the UE may declare a beam failure right away (e.g., may result in the UE quickly entering RLF as no alternative beam is introduced); and/or the UE may declare a beam failure if a certain amount of time has elapsed and no new beam has been identified; and/or the UE may ask for a new RS configuration for new beam identification.

In some embodiments, a UE may detect that all serving DL control beams fail in terms of a low quality of all beam failure detection reference signals (e.g., RSRP measurements or SINR-like metrics such as the BLER of a hypothetical PDCCH channel), but the UE may not immediately identify new candidate beams for beam failure recovery (e.g., the quality of all monitored beams such as the currently configured DL RS for new candidate beam identification) are also low, then the UE may make a decision on beam failure declaration based on a beam failure declaration timer. In certain embodiments, if new candidate beams with good enough quality are found before an expiration of the "beam failure declaration" timer, then a beam failure recovery request message may be transmitted to the network entity. The beam failure recovery request message may include and/or be based on the new candidate beams. However, in various embodiments, if the "beam failure declaration" timer expires and new candidate beams are not found, a UE may declare a beam failure and may request a new configuration of a candidate beam identification RS. As may be appreciated, a value of the "beam failure declaration" timer may be configurable in a UE/service/deployment-specific manner.

In one embodiment, a UE may send a candidate beam update request to request an update to a configuration of the candidate beam identification RS in response to a certain number or a certain fraction of serving DL control beams failing. In another embodiment, a UE may send a request only in response to a certain number or a certain fraction of serving DL control beams failing within a certain time period.

In various embodiments, an advantage of having a timer may be: (i) to avoid an unnecessarily long wait time for a wireless channel condition of configured under-monitor beams to get better; and/or (ii) to avoid an unnecessarily fast declaration of a beam failure without candidate beam identification.

In some embodiments, in a beam management procedure (e.g., a P2/P3 procedure), an existing DL beam for control or data corresponding to a DL RS may get updated (e.g., changed or refined). In certain embodiments, in a beam failure recovery procedure, all serving DL control beams may fail. Both of the beam management procedures may include identifying new replacement beams. In such embodiments, the replacement may be based on previous or new RS measurements (e.g., RSRP measurements). In various embodiments, a replaced beam may enhance performance of beam management, and/or a set of new DL control serving beams may be identified via beam failure recovery and may be stable and/or robust and may not go through another beam failure.

In one embodiment, if multiple candidate replacement beams appear to have close individual performance (e.g., multiple RS with high RSRP measurement values), a UE may consider other criteria for choosing among the candidate replacement beams. In certain embodiments, criteria may consider how new beams behave related to old failed and/or replaced beams and the existing good quality beams. For example, a UE may not identify one and/or some DL beams as new candidate beams if their correlation with old failed and/or replaced beams are greater than a certain configured and/or predefined threshold, although their measured RSRP values may be high. In another example, a UE may identify certain beams, even with slightly lower RSRP measurements, if they appear to facilitate diversity or multiplexing reception along with the existing beams (e.g., if they can be simultaneously received on the same UE receive beam on the same UE panel or if the interference from other existing beams to the newly identified beam and vice versa appears to be low). In some embodiments, low complexity search methods may be used such as modified depth-first tree search algorithms with adjustable node and/or edge labels.

In certain embodiments, for power control of a multi-beam wireless network, in addition to a configurable beam-specific (e.g., or group-specific) open loop power control, a beam-specific closed loop TPC command with accumulation option (e.g., possibly with larger step size) and with carry over or reset of the accumulated value across beams (e.g., or beam groups), at least for mm-Wave frequency bands may be considered. In various embodiments, it may not be economical for a UE to maintain multiple accumulated TPC values for multiple BPLs. In some embodiments, if 2-panels of one UE are connected with 2 TRPs respectively, two sets of power control parameters (e.g., including two TPC commands) may be used. In certain embodiments, a single TPC command may be used with a configurable additional power offset applied on a common TPC accumulation process. Moreover, such embodiments may be used whenever beam change or switching occurs within a same TRP, depending on a targeted service (e.g., URLLC and/or eV2X).

In one embodiment, for a closed-loop part of a UE's UL power control procedure, two new elements may be used: a UE may be configured with a single beam-common TPC command with accumulation, and at the same time, may be configured with an UL-beam-group-specific configurable absolute power offset (e.g., without accumulation). In one example, the absolute TPC command contributes to the accumulated TPC command and gets accumulated, while in another example, the absolute TPC command is simply a separate power offset term and does not contribute to the accumulated TPC command and does not get accumulated. In some embodiments, a TPC command may be shared among all beams and an accumulation status may be carried over at a time of switching beams, so that a single TPC loop may be effectively used. In such embodiments, complexity, memory, and signaling requirements may be reduced. In one example, the network may configure the absolute power offset values based on its own measurements of UL reference signals, based on UE RSRP measurement reports of the DL reference signals, or based on UE recommendation for absolute power offset values possibly in a UE capability reporting.

In certain embodiments, for absolute power offset, UL beam groups may be formed (e.g., for power control) as follows: form "UE TX beam groups" based on UE hardware implementation and/or RSRP values of corresponding UE RX (e.g., DL RS) measurements. In various embodiments, UE TX beams may be put on each UE panel inside of the same "UE TX beam groups" if their power patterns are not significantly different. In some embodiments, beams having close RSRP and/or pathloss may be put into the same UE TX beam groups. In certain embodiments, to avoid a ping-pong effect on forming "UE TX beam groups," L1 (and/or possibly L3) time averaging may be considered over an appropriate time window.

In certain embodiments, in response to UE TX beam groups being formed, the following may be performed: in response to beam switching occurring within a single "UE TX beam groups", a TPC command of accumulated value may be carried over; and in response to beam switching occurring across different "UE TX beam groups", the TPC command of accumulated value may be carried over and a group-specific power offset may be applied based on an average difference of RSRPs between the two groups.

In various embodiments, a goal for introducing a power offset may be to let a UE converge to a stable power level quickly, rather than taking multiple TPC commands to converge, which may be time-consuming. In some embodiments, small power variations within "UE TX beam groups" may be considered to be handled by a TPC command, so no extra offset may be used within a group thereby reducing signaling (e.g., in comparison with a potential beam-specific scheme which applies a power offset term on a beam-by-beam basis).

In certain embodiments, an advantage of beam-group-specific absolute power offset over beam-specific TPC command with accumulation may be that: (i) a single accumulated TPC loop may be used even if a UE communicates with two different TRPs thereby simplifying power control operation and no reset of accumulation is used for very different beams if two beams are very different and simply apply an appropriate offset but do not reset the TPC accumulation. In such embodiments, a power offset may keep a size of the TPC command small.

In various embodiments, to simplify signaling, an offset value may be selected from a set of fixed and/or configured numbers. In such embodiments, instead of signaling actual real values of the power offset, a UE may signal an index of a corresponding offset value. Such signaling may happen over MAC-CE.

Certain embodiments may use an absolute offset in addition to a single TPC accumulation. However, other embodiments may consider power offset to be based on a UE-centric UL beam grouping, rather than a network-centric beam grouping based on TRP configurations. Some embodiments may form UL beam groups based on RSRP measurements which are characteristics of end-to-end channel of a BPL, rather than simply being a function of a TRP receive beam.

In one embodiment, an open-loop base level Po range may be dependent on a band such as an operating band, or an operating band combination. For example, in certain embodiments, a Po range of a SUL carrier may be dependent on a primary cell (e.g., PCell or PSCell) operating band. As used herein, SUL may refer to conditions in which there is only an UL resource for a carrier. In some embodiments, this may be from a particular RAT perspective, such as NR RAT. In various embodiments, a SUL frequency may be a frequency shared with LTE UL (e.g., at least for the case when NR spectrum is below 6 GHz). In certain embodiments, for LTE RAT, a carrier corresponding to a SUL frequency may be in an operating band with both UL operating band and DL operating band. In one example, a UE is indicated an index to an entry of a Po range table to use for an UL operating band without a linked DL operating band (e.g., supplementary UL frequency).

In some embodiments, a UE may have multiple antenna panels and/or arrays (or subarrays, antenna groups). In various embodiments, RX and/or TX Antenna ports or beams from an antenna panel may be QCL with respect to certain QCL parameters such as: average delay and/or Doppler parameters. In certain embodiments, RX and/or TX Antenna ports or beams from different antenna panels may not be spatially QCL. In some embodiments, different antenna arrays may have different number of antenna elements, different polarization (e.g., some arrays may include dual, or cross polarized antenna elements), two spatial layers within one beam (e.g., one set of beamforming coefficients), a single polarization antenna element (e.g., may support one layer per beam), and/or different spatial directivity of the beams formed from the different antenna arrays. In various embodiments, some arrays may be RX only while others are RX and TX capable. In certain embodiments, a number of arrays with TX capability may be smaller than a number of arrays with RX capability. In certain embodiments, only a subset of receive antenna arrays may be operable at a given time. For example, a UE may have 4 arrays but may only be capable of receiving (e.g., RX RF chains) up to two arrays at a given time. In various embodiments, for TX, a UE may only be capable of transmitting (e.g., TX chain) on two antenna arrays of four antenna arrays but may only transmit on one antenna array at a time. In some embodiments, a UE may have 2 arrays (e.g., A1 and A2), both being RX capable while only A1 is capable of TX. In such embodiments, A1 may be considered as a primary antenna array and A2 may be considered as a secondary RX antenna array. In certain embodiments, a UE may or may not have beam correspondence on A1. In various embodiments, a UE may report its MIMO capability information to a network (e.g., gNB) via the following: a number of RX antenna groups; supported RX antenna group combinations; a maximum number of supported RX spatial layers for each antenna group and for each antenna group combination; a number of TX antenna groups; supported TX antenna group combinations; a maximum number of supported TX spatial layers for each antenna group and for each antenna group combination; a number of antenna ports for each antenna group (e.g., to support Tx diversity schemes); antenna gain offset with respect to a reference TX antenna group; and/or UE TX and/or RX beam correspondence. In some embodiments, for each TX antenna group, a UE may explicitly indicate an RX antenna group having beam correspondence and/or the UE may indicate a number of TX antenna groups with beam correspondence in which a mapping between a TX antenna group index and an RX antenna group index for beam correspondence is pre-determined and known to both the UE and a gNB.

In one embodiment, a UE may send a measurement report (e.g., Layer 3 or Layer 1) including SS block measurements. In various embodiments, a UE may measure SS blocks with different RX antenna groups, and may report the best 'N' SS blocks and corresponding RX antenna groups. In certain embodiments, a UE may receive CSI-RS configuration information in which a set of CSI-RS resources are configured for every RX antenna group, and may be reported in an SS block measurement report. In some embodiments, a UE may select one or a few CSI-RS resources based on measurements and may report corresponding measurement results per RX antenna group that has configured CSI-RS resources.

In some embodiments, Tx/Rx beam correspondence at TRP and UE can be considered as the following:

1) Tx/Rx beam correspondence at TRP holds if at least one of the following is satisfied: TRP is able to determine a TRP Rx beam for the uplink reception based on UE's downlink measurement on TRP's one or more Tx beams; and/or TRP is able to determine a TRP Tx beam for the downlink transmission based on TRP's uplink measurement on TRP's one or more Rx beams.

2) Tx/Rx beam correspondence at UE holds if at least one of the following is satisfied: UE is able to determine a UE Tx beam for the uplink transmission based on UE's downlink measurement on UE's one or more Rx beams; and/or UE is able to determine a UE Rx beam for the downlink reception based on TRP's indication based on uplink measurement on UE's one or more Tx beams.

In one example, beam correspondence may include each transmit antenna port can be beamformed in a desirable direction but may not imply setting or control of phase across antenna ports.

In certain embodiments, a UE may measure (e.g., RSRP) and may track serving beams and beam management candidate beams with RX beams on antenna arrays that are not capable of being transmitted on. In some embodiments, a UE may periodically measure RSRP for one or more serving beams (e.g., serving beams, CSI-RS resources, and/or SS/PBCH block resources configured for path loss measurement) on an antenna array capable of uplink transmission. In various embodiments, measurements may be considered from a UE's perspective as intra-frequency measurements with corresponding intra-frequency measurement accuracy requirements. In some embodiments, a UE may use measurements on an antenna array capable of TX corresponding to a serving beam for UL power control and may transmit a power setting and a PHR computation. In such embodiments, a pathloss reference linking may be changed at a UE side (e.g., using a different RX beam on a different antenna panel that is capable of TX than the RX beam and/or antenna panel used for DL beam tracking and/or management and mobility measurements). In certain embodiments, a UE may indicate to a network (e.g., gNB) whether a MAC entity has applied a change in a pathloss reference linking (e.g., at the UE side) or in other words a different UE side pathloss reference linking (e.g., than a UE RX beam and/or RX array) used for DL beam tracking and/or management for the serving beam in a PHR. In such embodiments, this indication may be in the form of a bit, O, with MAC entity setting O=1 if the corresponding power headroom level field would have had a different value if no pathloss reference linking change (e.g., or RSRP measurements using a UE RX beam and/or RX array used for DL beam tracking and/or management for a serving beam) had been applied.

In some embodiments, RSRP measurements on an antenna array capable of TX may not be available or may be out-of-date (e.g., not updated for more than a certain time period). In various embodiments, a UE may apply an offset to an RSRP measurement of a serving beam used for DL beam tracking and/or management (e.g., on a receive antenna array), may use the offset RSRP value for UL power control, and/or may transmit a power setting and PHR computation. In certain embodiments, UE power control equations may include an additional power offset term in addition to a pathloss ("PL") term with an RSRP measurement of a serving beam used for DL beam tracking and/or management used to compute the PL term. In some embodiments, a power offset value may be determined based on an antenna array architecture such as a difference in a number of antenna elements and/or antenna gain between a TX capable antenna array and a RX array used for RSRP measurements. In such embodiments, the offset may be UE implementation specific. In one example, the network may configure the offset values based on its own measurements of UL reference signals, based on UE RSRP measurement reports of the DL reference signals, or based on UE recommendation for offset values possibly in a UE capability reporting. In various embodiments, a UE may indicate to a network (e.g., gNB) whether a MAC entity has applied an additional power offset term in a PHR. In such embodiments, the indication may be in the form of a bit, O', with MAC entity setting O'=1 if the corresponding the power headroom level field would have had a different value if no additional power offset had been applied. In one example, a same bit field is used to indicate whether the MAC entity has applied a change in the pathloss reference linking or an additional power offset term to compute the power headroom level. In one example, a multi-bit field in the PHR may be used to indicate to the network which offset value is applied by the UE, e.g., a 2-bit field to indicate one of 4 possible offset values.

In some embodiments, in a context of DL beam management for a UE, the UE may report a limited number of good quality DL beams based on measurements for a larger set of beams (e.g., possibly through beam sweeping). In such embodiments, in response to good beams being identified, a network entity may refer to the beams in later scheduling of radio resources for transmission of data or control to a UE. In certain embodiments, a reference procedure may be known as beam indication. In various embodiments, a network entity may need to indicate to a UE which DL RS (e.g., CSI-RS or SS Block) antenna ports are QCL with the PDSCH DMRS antenna ports.

In some embodiments, there may be at least three different methods for beam indication. A first method may be explicit beam indication in which the beam is explicitly indicated using a CRI or an SS-Block index. A second method may be a low-overhead beam tagging method referred to as a MI method or a QRI method that gives a short tag to a BPL and uses the tag for beam indication. In such embodiments, the tag may be only a function of a TRP TX beam. A third method may be similar to the second method with the difference that the BPL tag is a function of the UE RX beam.

In certain embodiments, an advantage of the second and third methods in relation to the first method may be that the indication signaling is within a limited number of strong DL RSs reported by a UE to a network rather than all measured DL RSs so that they provide significant signaling reduction. In various embodiments, an advantage of the third method (e.g., UE-based beam tagging) in relation to the second method (e.g., network-based beam tagging) may be that potentially more saving is possible because a number of UE RX beams may be much less than a number of TRP TX beams. However, in some embodiments, a drawback may be that a QCL assumption may not be completely and/or appropriately indicated to a UE, and also additional bookkeeping (and corresponding concerns over failure of feedback update) may be used between the UE and a network because the tags are defined on the UE side.

In one embodiment, a UE may use a group-based beam tagging for beam indication as follows: a first step may be to categorize BPLs into a number of groups based on a UE hardware implementation, namely UE antenna panels and/or subarrays or a smallest UE antenna entity that may receive only a single beam so that DL BPLs that are received at a same UE panel and/or subarray may belong to the same beam group (reported BPLs may be considered and not all measured beams); a second step may be to assign tags to the BPLs within each group in which the same tags may be reused across groups. For the second step, one may use either a gNB-based beam tagging or a UE-based beam tagging, although the gNB-based beam tagging may be more appropriate.

In certain embodiments, a gNB may be aware of a mapping between its own TRP TX beams and tags assigned to BPLs (e.g., reported BPLs), but may not know the mapping with UE RX beams. In such embodiments, the UE may know the mapping between the BPL tags and its own UE RX beam, but may not know the mapping to the TRP TX beams.

In one embodiment, it may be assumed that a number of beams to be indicated is equal to a number of beam groups. For example, 2 beams may be indicated for a 2-panel UE. In another example, it may be assumed that contradictory beam indication may not be intended. That is, in some embodiments, a UE may be able to receive 2 indicated beams simultaneously on the same or different groups and/or panels.

In certain embodiments, for the purpose of beam indication, an implicit ordering across groups may be agreed upon between a UE and a gNB so that no indication of a group index is used. In various embodiments, in a scenario with N beam groups (e.g., N panels), in response to a gNB seeking to indicate the use of N beams (e.g., N DL RSs), the gNB may indicate a tag within each group in a sequence. In such embodiments, in response to the UE receiving the indication, the UE may choose the UE RX beam corresponding to each tag from each group and/or panel for the purpose of beam reception.

In some embodiments, there may be extra saving in signaling that comes from reusing tags across groups and/or panels. One embodiment is illustrated in a 2-panel UE illustrated in FIG. 4, in which only the strongest reported BPLs are illustrated.

Figure 4:
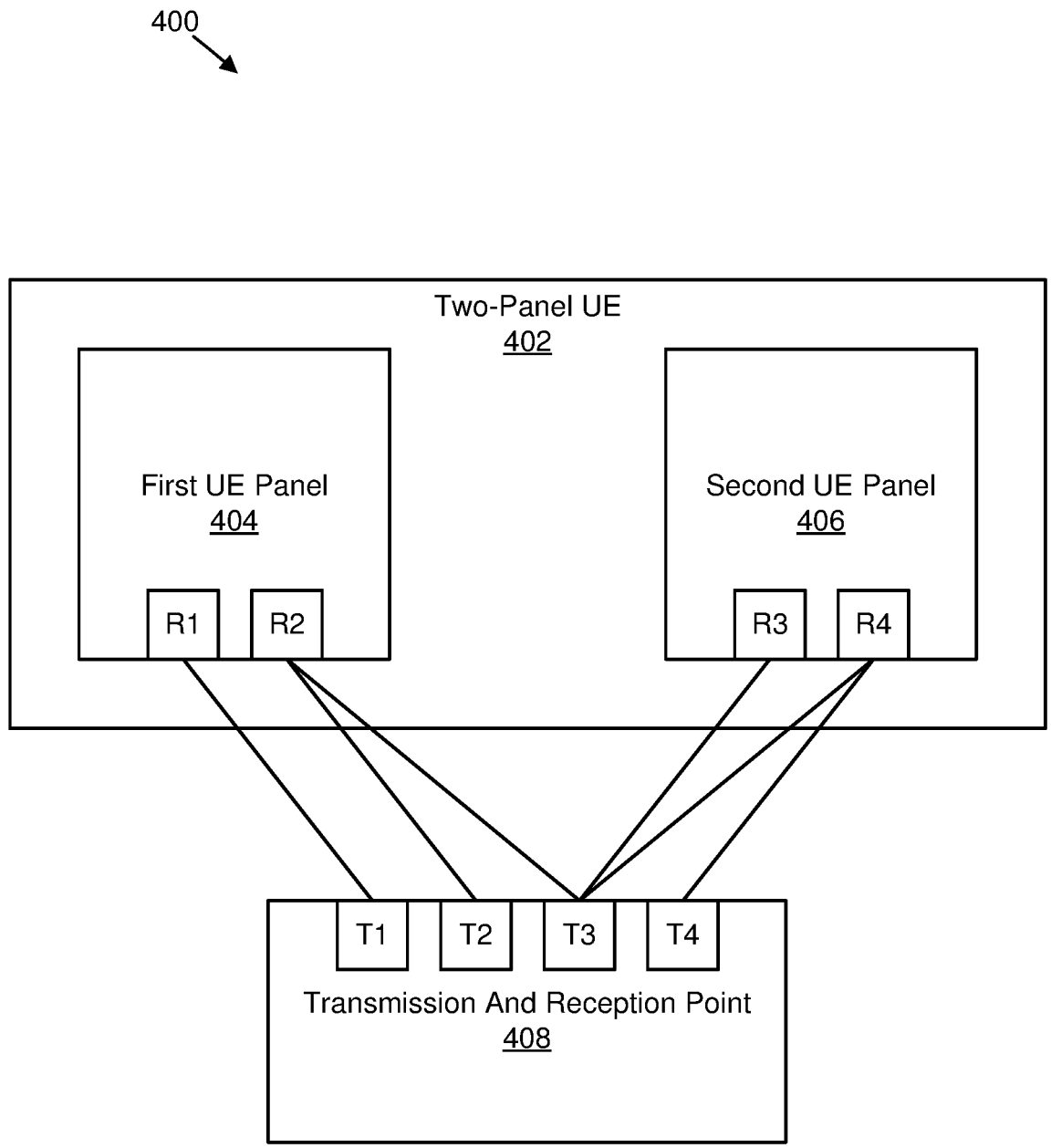
FIG. 4 is a schematic block diagram illustrating one embodiment of a system including a two-panel UE.

FIG. 4 is a schematic block diagram illustrating one embodiment of a system 400 including a two-panel UE 402. The two-panel UE 402 includes a first UE panel 404 and a second UE panel 406. Moreover, the first UE panel 404 includes a first RX beam R1 and a second RX beam R2, and the second UE panel 406 includes a third RX beam R3 and a fourth RX beam R4. The system 400 also includes a transmission and reception point 408. The transmission and reception point 408 includes a first TX beam T1, a second TX beam T2, a third TX beam T3, and a fourth TX beam T4. In the illustrated embodiment of FIG. 4: the first TX beam T1 may communicate with the first RX beam R1; the second TX beam T2 may communicate with the second RX beam R2; the third TX beam T3 may communicate with the second RX beam R2, the third RX beam R3, and the fourth RX beam R4; and the fourth TX beam T4 may communicate with the fourth RX beam R4.

Figure 5:
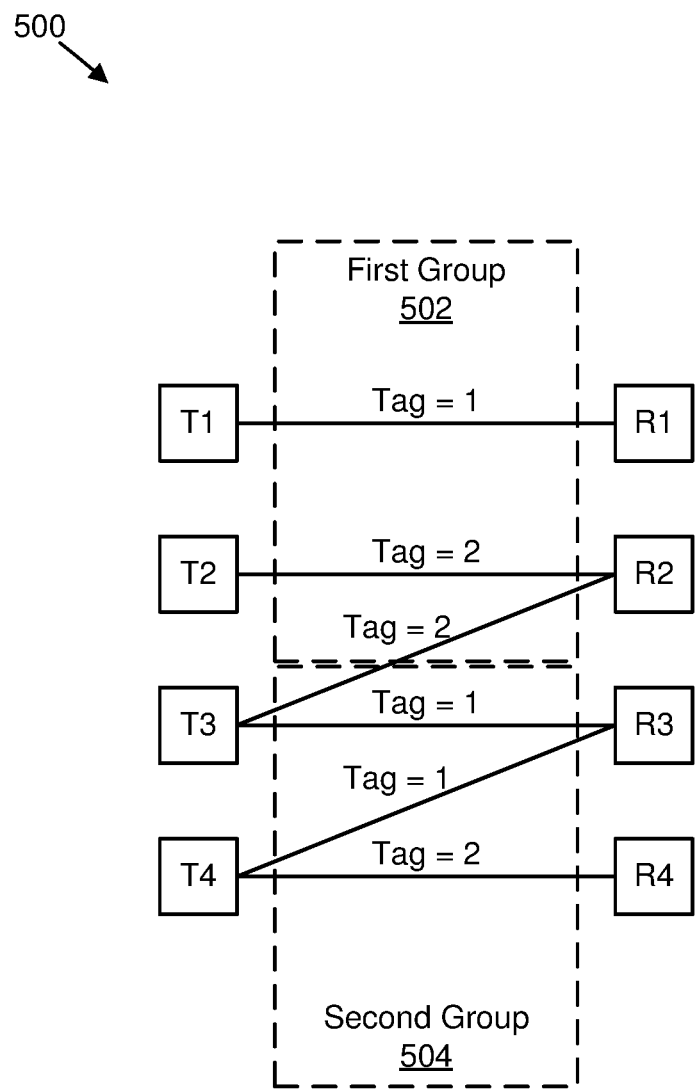
FIG. 5 is a schematic block diagram illustrating one embodiment of a system using UE-based beam tagging.

As illustrated in FIG. 5, TRP TX beams may be used as vertices for one part and UE RX beams may be used as vertices for the other part. Specifically, FIG. 5 is a schematic block diagram illustrating one embodiment of a system 500 using UE-based beam tagging. The system 500 includes a first TX beam T1, a second TX beam T2, a third TX beam T3, and a fourth TX beam T4 that may be part of a TRP. The system 500 also includes a first RX beam R1, a second RX beam R2, a third RX beam R3, and a fourth RX beam R4 that may be part of a UE. The UE-based beam tagging may divide the tagging into a first group 502 and a second group 504. The first group 502 of tagging may include communication between the first RX beam R1 and the first TX beam T1 tagged with a tag=1, and communication between the second RX beam R2, the second TX beam T2, and the third TX beam T3 tagged with a tag=2. Moreover, the second group 504 of tagging may include communication between the third RX beam R3, the third TX beam T3, and the fourth TX beam T4 tagged with a tag=1, and communication between the fourth RX beam R4 and the fourth TX beam T4 tagged with a tag=2.

In various embodiments, to indicate 2 DL beams based on a group-based tagging scheme, such as the group-based tagging scheme illustrated in FIG. 5, selected TRP TX beams may be indicated using log(2*2)=log(4)=2 bits to convey the indication with reduced signaling overhead.

Figure 6:
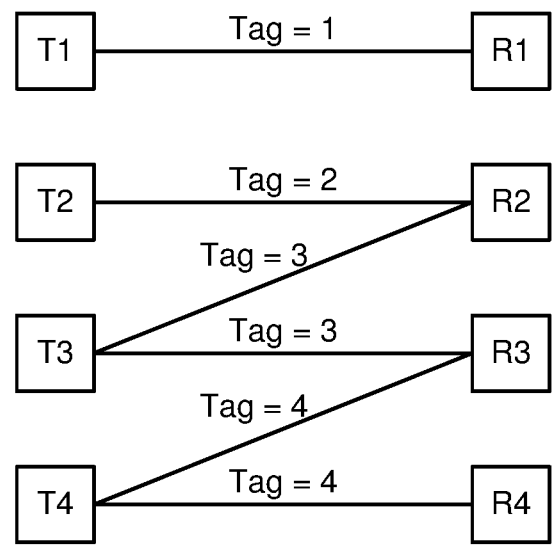
FIG. 6 is a schematic block diagram illustrating one embodiment of a system using TRP-based beam tagging.
Figure 7:
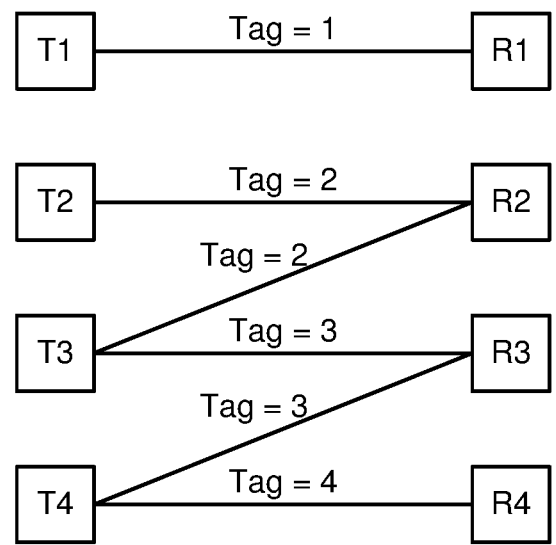
FIG. 7 is a schematic block diagram illustrating another embodiment of a system using UE-based beam tagging.

In certain embodiments, a non-group-based beam tagging may use 4 indication tags as shown in FIGS. 6 and 7. FIG.

6 illustrates TRP-based non-group-based beam tagging in which tags are functions of TRP TX beams. FIG. 7 illustrates UE-based non-group-based beam tagging in which tags are functions of UE RX beams. In either embodiment, indicating a pair of BPLs may involve log(4*4)=log(16)=4 bits of signaling overhead.

FIG. 6 is a schematic block diagram illustrating one embodiment of a system 600 using TRP-based beam tagging. The system 600 includes a first TX beam T1, a second TX beam T2, a third TX beam T3, and a fourth TX beam T4 that may be part of a TRP. The system 600 also includes a first RX beam R1, a second RX beam R2, a third RX beam R3, and a fourth RX beam R4 that may be part of a UE. The TRP-based beam tagging may include communication between the first TX beam T1 and the first RX beam R1 tagged with a tag=1, communication between the second TX beam T2 and the second RX beam R2 tagged with a tag=2, communication between the third TX beam T3, the second RX beam R2, and the third RX beam R3 tagged with a tag=3, and communication between the fourth TX beam T4, the third RX beam R3, and the fourth RX beam R4 tagged with a tag=4.

FIG. 7 is a schematic block diagram illustrating another embodiment of a system 700 using UE-based beam tagging. The system 700 includes a first TX beam T1, a second TX beam T2, a third TX beam T3, and a fourth TX beam T4 that may be part of a TRP. The system 700 also includes a first RX beam R1, a second RX beam R2, a third RX beam R3, and a fourth RX beam R4 that may be part of a UE. The UE-based beam tagging may include communication between the first RX beam R1 and the first TX beam T1 tagged with a tag=1, communication between the second RX beam R2, the second TX beam T2, and the third TX beam T3 tagged with a tag=2, communication between the third RX beam R3, the third TX beam T3, and the fourth TX beam T3 tagged with a tag=3, and communication between the fourth RX beam R4 and the fourth TX beam T4 tagged with a tag=4.

In one embodiment, a configured SR (e.g., transmitted on PUCCH) may be associated with either short or long PUCCH format. Depending on the network scheduling decisions, a slot may only support a short PUCCH or a long PUCCH of certain symbol lengths (e.g., transmission durations) and may not support both short PUCCH and long PUCCH transmissions in the same slot from different UEs. To provide an early indication to a network (e.g., gNB) of a type of traffic on a logical channel (e.g., a "numerology/TTI type" of a logical channel) and more frequent SR transmission opportunities for latency critical traffics, a logical channel may be associated with multiple SR configurations (e.g., a first SR configuration associated with a short PUCCH), and a second SR configuration associated with a long PUCCH. The short PUCCH may correspond to a first PUCCH duration (e.g., number of symbols comprising the short PUCCH) and the long PUCCH may correspond to a second PUCCH duration (different than the first PUCCH duration). The logical channel may be associated with a third SR configuration corresponding to a short PUCCH with a third PUCCH duration (e.g., different than the first and second PUCCH duration) and a fourth SR configuration corresponding to a long PUCCH with a fourth PUCCH duration (e.g., different than the first, second, third PUCCH duration). For a logical channel with multiple SR configurations, a UE may be indicated a priority order of which SR (e.g., first/second/third/fourth) is triggered and transmitted in a slot when two or more of the multiple SR configurations are valid in the slot (e.g., first SR configuration with short PUCCH of first duration and third SR configuration with short PUCCH of third duration). If multiple SR configurations are supported for a logical channel, a UE may transmit SR in the earliest slot that supports at least one of the multiple SR configurations configured for the logical channel.

Figure 8:
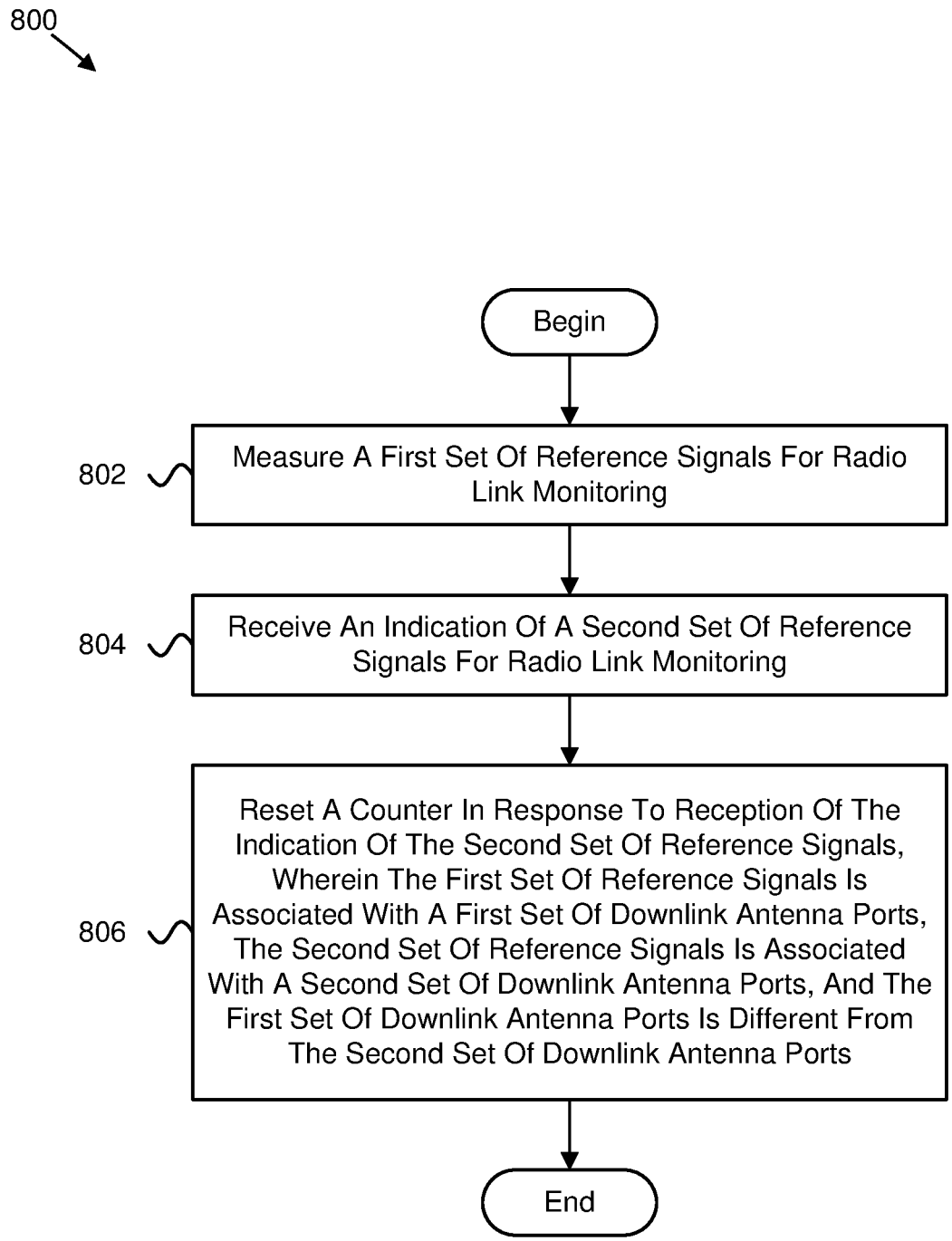
FIG. 8 is a schematic block diagram illustrating one embodiment of a method for radio link monitoring.

FIG. 8 is a schematic block diagram illustrating one embodiment of a method 800 for radio link monitoring. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include measuring 802 a first set of reference signals for radio link monitoring. In certain embodiments, the method 800 includes receiving 804 an indication of a second set of reference signals for radio link monitoring. In various embodiments, the method 800 includes resetting 806 a counter in response to reception of the indication of the second set of reference signals. In some embodiments, the first set of reference signals is associated with a first set of downlink antenna ports, the second set of reference signals is associated with a second set of downlink antenna ports, and the first set of downlink antenna ports is different from the second set of downlink antenna ports.

In various embodiments, the method 800 includes: generating a first in-sync indication or an out-of-sync indication based on measuring the first set of reference signals; generating a second in-sync indication in response to reception of the indication of the second set of reference signals if a value of the counter is not zero; incrementing the counter in response to generation of the out-of-sync indication; and resetting the counter in response to the first in-sync indication being generated or in response to the second in-sync indication being generated. In some embodiments, the method 800 includes: initiating a radio link failure timer based on a result from measuring the first set of reference signals, wherein a radio link failure is identified in response to expiration of the radio link failure timer; and stopping the radio link failure timer in response to reception of the indication of the second set of reference signals. In certain embodiments, the first and second sets of reference signals comprise a non-zero transmit power channel state information-reference signal, a synchronization signal/physical broadcast channel block, or some combination thereof. In various embodiments, the first set of reference signals is associated with a first set of serving physical downlink control channels, and the second set of reference signals is associated with a second set of serving physical downlink control channels. In some embodiments, the indication of the second set of reference signals is received in a physical downlink shared channel scheduled via a physical downlink control channel, and the physical downlink control channel is associated with a reference signal of the second set of reference signals. In certain embodiments, a subset of the first set of reference signals and a subset of the second set of reference signals are associated with a third set of downlink antenna ports, and the third set of downlink antenna ports is a subset of the first set of downlink antenna ports and also a subset of the second set of downlink antenna ports. In various embodiments, the method 800 includes computing a metric for radio link monitoring for the third set of downlink antenna ports by combining a first measurement of the subset of the first set of reference signals and a second measurement of the subset of the second set of reference signals. In some embodiments, the method 800 includes:

transmitting a beam failure recovery request; and receiving a response to the beam failure recovery request, wherein the response comprises configuration information corresponding to the second set of reference signals.

In some embodiments, the method 800 includes: transmitting a beam failure recovery request for a source cell; generating an indication of beam recovery failure in response to failing to receive a response to the beam failure recovery request within a configured time window; initiating a connection reestablishment procedure comprising a selection of a target cell in response to the indication of the beam recovery failure; retransmitting the beam failure recovery request for the source cell; determining whether beam recovery corresponding to retransmitting the beam failure recovery request succeeds; determining whether the connection reestablishment procedure with the target cell succeeds; in response to the beam recovery succeeding and the connection reestablishment procedure being unsuccessful, maintaining a first connection with the source cell; in response to the beam recovery being unsuccessful and the reestablishment procedure succeeding, establishing a second connection with the target cell; in response to the beam recovery succeeding before the reestablishment procedure succeeds, maintaining the first connection with the source cell; in response to the beam recovery succeeding after the reestablishment procedure succeeds, establishing the second connection with the target cell; and in response to the beam recovery being unsuccessful and the reestablishment procedure being unsuccessful, entering an idle state.

In various embodiments, the method 800 includes: receiving an indication of at least one physical uplink control channel resource and at least one physical random access channel resource for transmitting a beam failure recovery request, wherein each of the at least one physical uplink control channel resource and the at least one physical random access channel resource are associated with at least one downlink antenna port; and determining an association between the at least one physical uplink control channel resource, the at least one physical random access channel resource, and the at least one downlink antenna port based on the indication of the at least one physical uplink control channel resource and the at least one physical random access channel resource for transmitting the beam failure recovery request.

In certain embodiments, the at least one downlink antenna port associated with the at least one physical uplink control channel resource is at least partially co-located with at least one serving downlink antenna port. In various embodiments, the method 800 includes transmitting a beam failure recovery request on the at least one physical uplink control channel resource based on a timing advance value associated with the at least one serving downlink antenna port. In some embodiments, the method 800 includes transmitting a beam failure recovery request on the at least one physical random access channel resource if a timing advance value associated with the at least one serving downlink antenna port is not valid.

Figure 9:
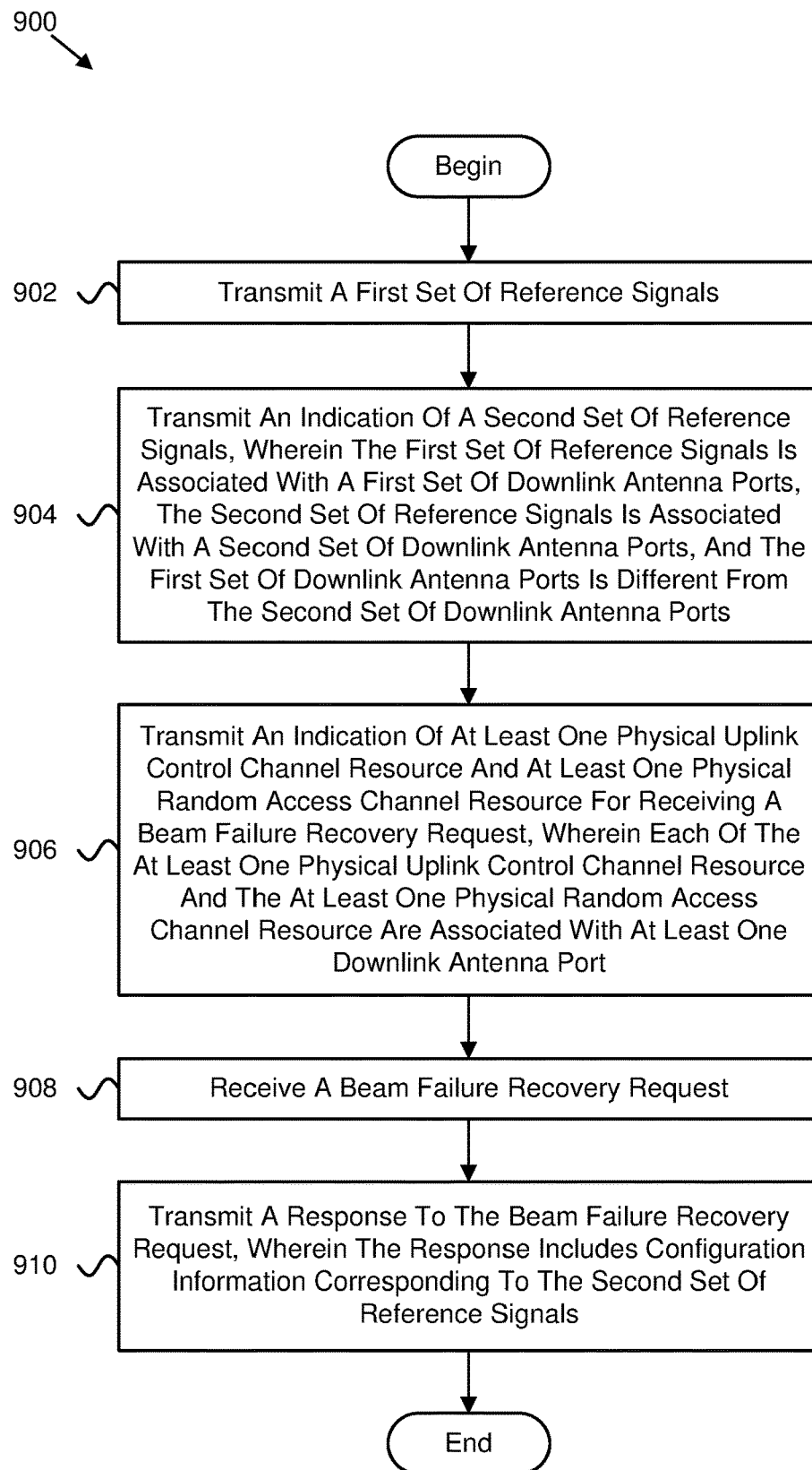
FIG. 9 is a schematic block diagram illustrating one embodiment of a method for beam failure recovery.

FIG. 9 is a schematic block diagram illustrating one embodiment of a method 900 for beam failure recovery. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include transmitting 902 a first set of reference signals. In various embodiments, the method 900 includes transmitting 904 an indication of a second set of reference signals. In such embodiments, the first set of reference signals is associated with a first set of downlink antenna ports, the second set of reference signals is associated with a second set of downlink antenna ports, and the first set of downlink antenna ports is different from the second set of downlink antenna ports. In certain embodiments, the method 900 includes transmitting 906 an indication of at least one physical uplink control channel resource and at least one physical random access channel resource for receiving a beam failure recovery request. In such embodiments, each of the at least one physical uplink control channel resource and the at least one physical random access channel resource are associated with at least one downlink antenna port. In some embodiments, the method 900 includes receiving 908 a beam failure recovery request. In various embodiments, the method 900 includes transmitting 910 a response to the beam failure recovery request. In such embodiments, the response includes configuration information corresponding to the second set of reference signals.

In various embodiments, the first and second sets of reference signals comprise a non-zero transmit power channel state information-reference signal, a synchronization signal/physical broadcast channel block, or some combination thereof. In some embodiments, the first set of reference signals is associated with a first set of serving physical downlink control channels, and the second set of reference signals is associated with a second set of serving physical downlink control channels. In certain embodiments, the indication of the second set of reference signals is transmitted in a physical downlink shared channel scheduled via a physical downlink control channel, and the physical downlink control channel is associated with a reference signal of the second set of reference signals. In some embodiments, a subset of the first set of reference signals and a subset of the second set of reference signals are associated with a third set of downlink antenna ports, and the third set of downlink antenna ports is a subset of the first set of downlink antenna ports and also a subset of the second set of downlink antenna ports. In certain embodiments, the at least one downlink antenna port associated with the at least one physical uplink control channel resource is at least partially co-located with at least one serving downlink antenna port. In various embodiments, the beam failure recovery request is received on the at least one physical uplink control channel resource based on a transmit timing advance value associated with the at least one serving downlink antenna port. In some embodiments, the beam failure recovery request is received on the at least one physical random access channel resource if a transmit timing advance value associated with the at least one serving downlink antenna port is not valid.

Figure 10:
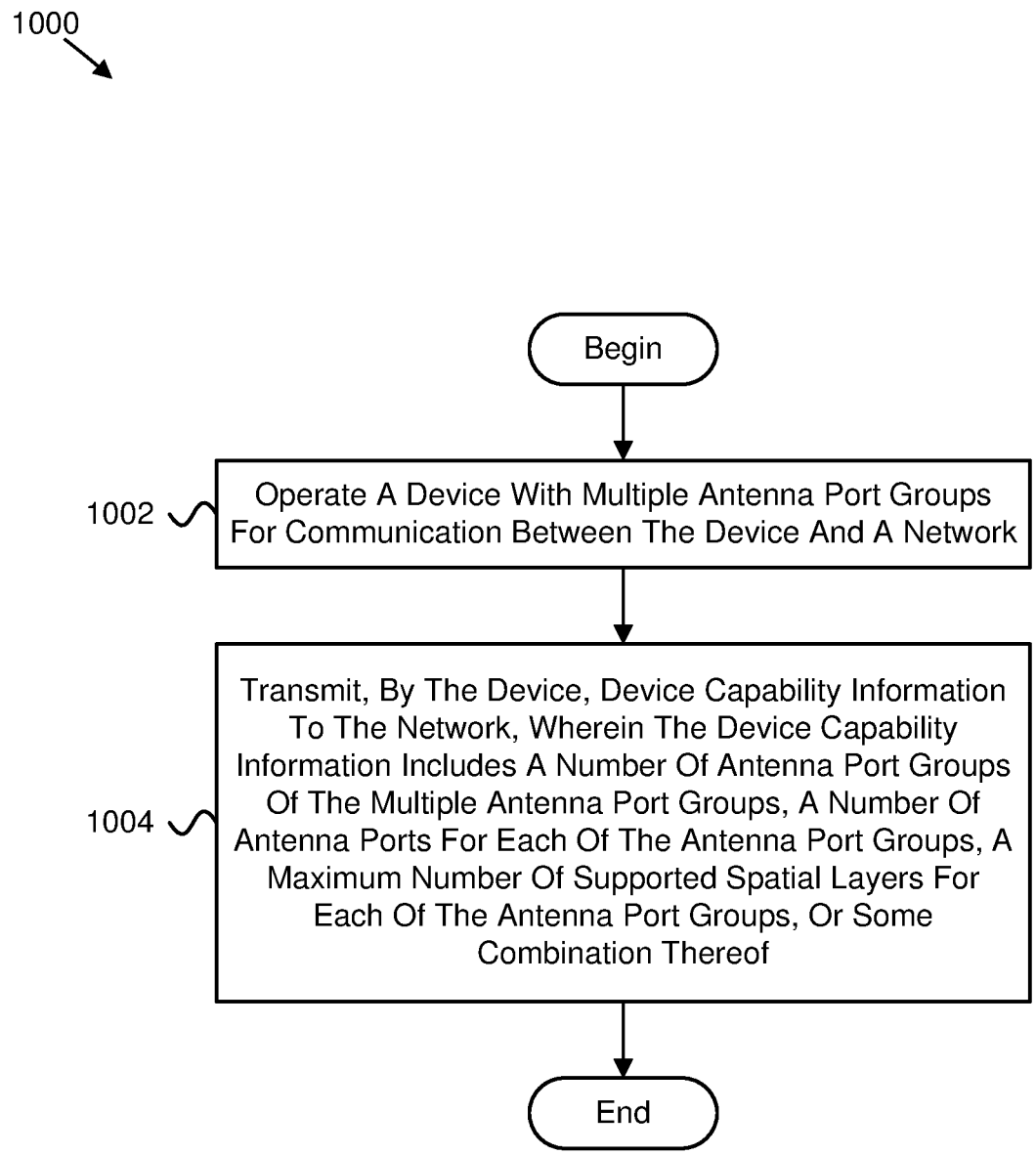
FIG. 10 is a schematic block diagram illustrating one embodiment of a method for transmitting device capability information.

FIG. 10 is a schematic block diagram illustrating one embodiment of a method 1000 for transmitting device capability information. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

The method 1000 may include operating 1002 a device with multiple antenna port groups for communication between the device and a network. In certain embodiments, the method includes transmitting 1004, by the device, device capability information to the network. In such embodiments, the device capability information includes a number of antenna port groups of the multiple antenna port groups, a number of antenna ports for each of the antenna port groups, a maximum number of supported spatial layers for each of the antenna port groups, or some combination thereof.

In various embodiments, the device capability information further includes a list of supported antenna port group combinations, a maximum number of supported spatial layers for each antenna port group combination of the list of supported antenna port group combinations, or some combination thereof. In some embodiments, a first antenna port group of a first supported antenna port group combination of the list of supported antenna port group combinations and a second antenna port group of the first supported antenna port group combination of the list of supported antenna port group combinations are operable simultaneously for communication between the device and the network. In certain embodiments, a first antenna port group of the multiple antenna port groups is part of a first antenna panel, and a second antenna port group of the multiple antenna port groups is part of a second antenna panel, and the first antenna panel is different from the second antenna panel. In various embodiments, a first subset of the multiple antenna port groups includes receive-capable antenna port groups and a second subset of the plurality of antenna port groups includes transmit-capable antenna port groups. In some embodiments, a first antenna port group of the multiple antenna port groups is a transmit-capable and receive-capable antenna port group, and the device capability information further includes beam correspondence capability information for the first antenna port group. In certain embodiments, a second antenna port group of the multiple antenna port groups is a receive-only capable antenna port group, the second antenna port group is different from the first antenna port group, and wherein the method 1000 further includes: receiving a reference signal on the second antenna port group; determining a path loss estimate based on the received reference signal; determining a transmit power of an uplink transmission on one or more antenna ports of the first antenna port group based on the determined path loss estimate and an offset term, wherein the offset term is based on a characteristic of the first antenna port group and the second antenna port group; and transmitting the uplink transmission on the one or more antenna ports of the first antenna port group with the determined transmit power. In various embodiments, the characteristic of the first antenna port group and the second antenna port group includes a number of antenna elements in the first antenna port group and the second antenna port group, an antenna gain of the first antenna port group and the second antenna port group, or some combination thereof. In some embodiments, the uplink transmission includes a power headroom report, the power headroom report includes an indication of the pathloss reference signal received on a different antenna port group than the one or more antenna ports of the first antenna port group used for transmitting the uplink transmission.

In some embodiments, the method 1000 includes: receiving a configuration of a first power-offset value for a first antenna port group of the plurality of antenna port groups, and a second power-offset value for a second antenna port group of the plurality of antenna port groups; receiving a transmit power control accumulation value for an uplink transmission on one or more antenna ports of the first antenna port group; determining a transmit power for the uplink transmission on the one or more antenna ports of the first antenna port group based on the first power-offset value associated with the first antenna port group, and the received transmit power control accumulation value; and transmitting the uplink transmission on the one or more antenna ports of the first antenna port group with the determined transmit power.

In various embodiments, a first antenna port group of the multiple antenna port groups is associated with a first set of one or more pathloss reference signals, a second antenna port group of the multiple antenna port groups is associated with a second set of one or more pathloss reference signal, and the first set of pathloss reference signals is different from the second set of pathloss reference signals.

In certain embodiments, the method 1000 includes: receiving a first set of downlink reference signals corresponding to a first set of network downlink beams on a first antenna port group of the plurality of antenna port groups, and a second set of downlink reference signals corresponding to a second set of network downlink beams on a second antenna port group of the plurality of antenna port groups; determining a first set of device receive beams based on the first antenna port group for receiving the first set of downlink reference signals corresponding to the first set of downlink beams, and a second set of device receive beams based on the second antenna port group for receiving the second set of downlink reference signals corresponding to the second set of downlink beams; identifying a tag index from a set $\{1, 2, \ldots, M\_max\}$ for each downlink beam of the first set of downlink beams and the second set of downlink beams; receiving a beam indication associated to a downlink transmission, wherein the beam indication comprises a first tag index from the set $\{1, 2, \ldots, M\_max\}$ associated with the first antenna port group, and a second tag index from the set $\{1, 2, \ldots, M\_max\}$ associated with the second antenna port group; and receiving downlink transmission based on a first receive beam of the determined first set of receive beams corresponding to a first downlink beam of the first set of downlink beams associated with the first tag index, and on a second receive beam of the determined second set of receive beams corresponding to a second downlink beam of the second set of downlink beams associated with the second tag index.

In some embodiments, the method 1000 includes: identifying the tag index based on one of: receiving, from the network, an indication of a tag index mapping for each downlink beam of the first set of downlink beams and the second set of downlink beams; and determining, by the device, the tag index and indicating to the network a tag index mapping for each downlink beam of the first set of downlink beams and the second set of downlink beams.

In certain embodiments, the method 1000 includes: receiving a plurality of downlink reference signals corresponding to a plurality of downlink beams on the first antenna port group and the second antenna port group; determining beam quality measurements for the plurality of downlink beams based on the received plurality of downlink reference signals; determining the first set of downlink reference signals from the plurality of downlink beams on the first antenna port group based on the determined beam quality measurements and a first beam quality criteria; and determining the second set of downlink reference signals from the plurality of downlink beams on the second antenna port group based on the determined beam quality measurements and a second beam quality criteria. As may be appreciated, a beam quality measurement may be an RSRP measurement. Moreover, a beam quality criterion may be a beam quality measurement exceeding a configured threshold for RSRP.

In various embodiments, a value for M_max is based on a size of the first set of downlink reference signals, a size of the second set of downlink reference signals, or some combination thereof.

In one embodiment, a method includes: measuring a first set of reference signals for radio link monitoring; receiving an indication of a second set of reference signals for radio link monitoring; and resetting a counter in response to reception of the indication of the second set of reference signals; wherein the first set of reference signals is associated with a first set of downlink antenna ports, the second set of reference signals is associated with a second set of downlink antenna ports, and the first set of downlink antenna ports is different from the second set of downlink antenna ports.

In certain embodiments, the method includes: generating a first in-sync indication or an out-of-sync indication based on measuring the first set of reference signals; generating a second in-sync indication in response to reception of the indication of the second set of reference signals if a value of the counter is not zero; incrementing the counter in response to generation of the out-of-sync indication; and resetting the counter in response to the first in-sync indication being generated or in response to the second in-sync indication being generated.

In some embodiments, the method includes: initiating a radio link failure timer based on a result from measuring the first set of reference signals, wherein a radio link failure is identified in response to expiration of the radio link failure timer; and stopping the radio link failure timer in response to reception of the indication of the second set of reference signals.

In various embodiments, the first and second sets of reference signals comprise a non-zero transmit power channel state information-reference signal, a synchronization signal/physical broadcast channel block, or some combination thereof.

In one embodiment, the first set of reference signals is associated with a first set of serving physical downlink control channels, and the second set of reference signals is associated with a second set of serving physical downlink control channels.

In certain embodiments, the indication of the second set of reference signals is received in a physical downlink shared channel scheduled via a physical downlink control channel, and the physical downlink control channel is associated with a reference signal of the second set of reference signals.

In some embodiments, a subset of the first set of reference signals and a subset of the second set of reference signals are associated with a third set of downlink antenna ports, and the third set of downlink antenna ports is a subset of the first set of downlink antenna ports and also a subset of the second set of downlink antenna ports.

In various embodiments, the method includes computing a metric for radio link monitoring for the third set of downlink antenna ports by combining a first measurement of the subset of the first set of reference signals and a second measurement of the subset of the second set of reference signals.

In one embodiment, the method includes: transmitting a beam failure recovery request; and receiving a response to the beam failure recovery request, wherein the response comprises configuration information corresponding to the second set of reference signals.

In certain embodiments, the method includes: transmitting a beam failure recovery request for a source cell; generating an indication of beam recovery failure in response to failing to receive a response to the beam failure recovery request within a configured time window; initiating a connection reestablishment procedure comprising a selection of a target cell in response to the indication of the beam recovery failure; retransmitting the beam failure recovery request for the source cell; determining whether beam recovery corresponding to retransmitting the beam failure recovery request succeeds; determining whether the connection reestablishment procedure with the target cell succeeds; in response to the beam recovery succeeding and the connection reestablishment procedure being unsuccessful, maintaining a first connection with the source cell; in response to the beam recovery being unsuccessful and the reestablishment procedure succeeding, establishing a second connection with the target cell; in response to the beam recovery succeeding before the reestablishment procedure succeeds, maintaining the first connection with the source cell; in response to the beam recovery succeeding after the reestablishment procedure succeeds, establishing the second connection with the target cell; and in response to the beam recovery being unsuccessful and the reestablishment procedure being unsuccessful, entering an idle state.

In some embodiments, the method includes: receiving an indication of at least one physical uplink control channel resource and at least one physical random access channel resource for transmitting a beam failure recovery request, wherein each of the at least one physical uplink control channel resource and the at least one physical random access channel resource are associated with at least one downlink antenna port; and determining an association between the at least one physical uplink control channel resource, the at least one physical random access channel resource, and the at least one downlink antenna port based on the indication of the at least one physical uplink control channel resource and the at least one physical random access channel resource for transmitting the beam failure recovery request.

In various embodiments, the at least one downlink antenna port associated with the at least one physical uplink control channel resource is at least partially co-located with at least one serving downlink antenna port.

In one embodiment, the method includes transmitting a beam failure recovery request on the at least one physical uplink control channel resource based on a timing advance value associated with the at least one serving downlink antenna port.

In certain embodiments, the method includes transmitting a beam failure recovery request on the at least one physical random access channel resource if a timing advance value associated with the at least one serving downlink antenna port is not valid.

In one embodiment, an apparatus includes: a processor that measures a first set of reference signals for radio link monitoring; and a receiver that receives an indication of a second set of reference signals for radio link monitoring; wherein the processor resets a counter in response to reception of the indication of the second set of reference signals, the first set of reference signals is associated with a first set of downlink antenna ports, the second set of reference signals is associated with a second set of downlink antenna ports, and the first set of downlink antenna ports is different from the second set of downlink antenna ports.

In certain embodiments, the processor: generates a first in-sync indication or an out-of-sync indication based on measuring the first set of reference signals; generates a second in-sync indication in response to reception of the indication of the second set of reference signals if a value of the counter is not zero; increments the counter in response to generation of the out-of-sync indication, and resets the counter in response to the first in-sync indication being generated or in response to the second in-sync indication being generated.

In some embodiments, the processor: initiates a radio link failure timer based on a result from measuring the first set of reference signals, wherein a radio link failure is identified in response to expiration of the radio link failure timer; and stops the radio link failure timer in response to reception of the indication of the second set of reference signals.

In various embodiments, the first and second sets of reference signals comprise a non-zero transmit power channel state information-reference signal, a synchronization signal/physical broadcast channel block, or some combination thereof.

In one embodiment, the first set of reference signals is associated with a first set of serving physical downlink control channels, and the second set of reference signals is associated with a second set of serving physical downlink control channels.

In certain embodiments, the indication of the second set of reference signals is received in a physical downlink shared channel scheduled via a physical downlink control channel, and the physical downlink control channel is associated with a reference signal of the second set of reference signals.

In some embodiments, a subset of the first set of reference signals and a subset of the second set of reference signals are associated with a third set of downlink antenna ports, and the third set of downlink antenna ports is a subset of the first set of downlink antenna ports and also a subset of the second set of downlink antenna ports.

In various embodiments, the processor computes a metric for radio link monitoring for the third set of downlink antenna ports by combining a first measurement of the subset of the first set of reference signals and a second measurement of the subset of the second set of reference signals.

In one embodiment, the apparatus includes a transmitter, wherein: the transmitter transmits a beam failure recovery request; and the receiver receives a response to the beam failure recovery request, wherein the response comprises configuration information corresponding to the second set of reference signals.

In certain embodiments, the apparatus includes a transmitter, wherein: the transmitter transmits a beam failure recovery request for a source cell; the processor: generates an indication of beam recovery failure in response to failing to receive a response to the beam failure recovery request within a configured time window; and initiates a connection reestablishment procedure comprising a selection of a target cell in response to the indication of the beam recovery failure; the transmitter retransmits the beam failure recovery request for the source cell; the processor: determines whether beam recovery corresponding to retransmitting the beam failure recovery request succeeds; determines whether the connection reestablishment procedure with the target cell succeeds; in response to the beam recovery succeeding and the connection reestablishment procedure being unsuccessful, maintains a first connection with the source cell; in response to the beam recovery being unsuccessful and the reestablishment procedure succeeding, establishes a second connection with the target cell; in response to the beam recovery succeeding before the reestablishment procedure succeeds, maintains the first connection with the source cell; in response to the beam recovery succeeding after the reestablishment procedure succeeds, establishes the second connection with the target cell; and in response to the beam recovery being unsuccessful and the reestablishment procedure being unsuccessful, the apparatus enters an idle state.

In some embodiments: the receiver receives an indication of at least one physical uplink control channel resource and at least one physical random access channel resource for transmitting a beam failure recovery request, wherein each of the at least one physical uplink control channel resource and the at least one physical random access channel resource are associated with at least one downlink antenna port; and the processor determines an association between the at least one physical uplink control channel resource, the at least one physical random access channel resource, and the at least one downlink antenna port based on the indication of the at least one physical uplink control channel resource and the at least one physical random access channel resource for transmitting the beam failure recovery request.

In various embodiments, the at least one downlink antenna port associated with the at least one physical uplink control channel resource is at least partially co-located with at least one serving downlink antenna port.

In one embodiment, the apparatus includes a transmitter that transmits a beam failure recovery request on the at least one physical uplink control channel resource based on a timing advance value associated with the at least one serving downlink antenna port.

In certain embodiments, the apparatus includes a transmitter that transmits a beam failure recovery request on the at least one physical random access channel resource if a timing advance value associated with the at least one serving downlink antenna port is not valid.

In one embodiment, a method includes: transmitting a first set of reference signals; transmitting an indication of a second set of reference signals, wherein the first set of reference signals is associated with a first set of downlink antenna ports, the second set of reference signals is associated with a second set of downlink antenna ports, and the first set of downlink antenna ports is different from the second set of downlink antenna ports; transmitting an indication of at least one physical uplink control channel resource and at least one physical random access channel resource for receiving a beam failure recovery request, wherein each of the at least one physical uplink control channel resource and the at least one physical random access channel resource are associated with at least one downlink antenna port; receiving a beam failure recovery request; and transmitting a response to the beam failure recovery request, wherein the response comprises configuration information corresponding to the second set of reference signals.

In certain embodiments, the first and second sets of reference signals comprise a non-zero transmit power channel state information-reference signal, a synchronization signal/physical broadcast channel block, or some combination thereof.

In some embodiments, the first set of reference signals is associated with a first set of serving physical downlink control channels, and the second set of reference signals is associated with a second set of serving physical downlink control channels.

In various embodiments, the indication of the second set of reference signals is transmitted in a physical downlink shared channel scheduled via a physical downlink control channel, and the physical downlink control channel is associated with a reference signal of the second set of reference signals.

In one embodiment, a subset of the first set of reference signals and a subset of the second set of reference signals are associated with a third set of downlink antenna ports, and the third set of downlink antenna ports is a subset of the first set of downlink antenna ports and also a subset of the second set of downlink antenna ports.

In certain embodiments, the at least one downlink antenna port associated with the at least one physical uplink control channel resource is at least partially co-located with at least one serving downlink antenna port.

In some embodiments, the beam failure recovery request is received on the at least one physical uplink control channel resource based on a transmit timing advance value associated with the at least one serving downlink antenna port.

In various embodiments, the beam failure recovery request is received on the at least one physical random access channel resource if a transmit timing advance value associated with the at least one serving downlink antenna port is not valid.

In one embodiment, an apparatus includes: a transmitter that: transmits a first set of reference signals; transmits an indication of a second set of reference signals, wherein the first set of reference signals is associated with a first set of downlink antenna ports, the second set of reference signals is associated with a second set of downlink antenna ports, and the first set of downlink antenna ports is different from the second set of downlink antenna ports; and transmits an indication of at least one physical uplink control channel resource and at least one physical random access channel resource for receiving a beam failure recovery request, wherein each of the at least one physical uplink control channel resource and the at least one physical random access channel resource are associated with at least one downlink antenna port; and a receiver that receives a beam failure recovery request; wherein the transmitter transmits a response to the beam failure recovery request, and the response comprises configuration information corresponding to the second set of reference signals.

In certain embodiments, the first and second sets of reference signals comprise a non-zero transmit power channel state information-reference signal, a synchronization signal/physical broadcast channel block, or some combination thereof.

In some embodiments, the first set of reference signals is associated with a first set of serving physical downlink control channels, and the second set of reference signals is associated with a second set of serving physical downlink control channels.

In various embodiments, the indication of the second set of reference signals is transmitted in a physical downlink shared channel scheduled via a physical downlink control channel, and the physical downlink control channel is associated with a reference signal of the second set of reference signals.

In one embodiment, a subset of the first set of reference signals and a subset of the second set of reference signals are associated with a third set of downlink antenna ports, and the third set of downlink antenna ports is a subset of the first set of downlink antenna ports and also a subset of the second set of downlink antenna ports.

In certain embodiments, the at least one downlink antenna port associated with the at least one physical uplink control channel resource is at least partially co-located with at least one serving downlink antenna port.

In some embodiments, the beam failure recovery request is received on the at least one physical uplink control channel resource based on a transmit timing advance value associated with the at least one serving downlink antenna port.

In various embodiments, the beam failure recovery request is received on the at least one physical random access channel resource if a transmit timing advance value associated with the at least one serving downlink antenna port is not valid.

In one embodiment, a method includes: operating a device with a plurality of antenna port groups for communication between the device and a network; and transmitting, by the device, device capability information to the network, wherein the device capability information comprises a number of antenna port groups of the plurality of antenna port groups, a number of antenna ports for each of the antenna port groups, a maximum number of supported spatial layers for each of the antenna port groups, or some combination thereof.

In certain embodiments, the device capability information further comprises a list of supported antenna port group combinations, a maximum number of supported spatial layers for each antenna port group combination of the list of supported antenna port group combinations, or some combination thereof.

In some embodiments, a first antenna port group of a first supported antenna port group combination of the list of supported antenna port group combinations and a second antenna port group of the first supported antenna port group combination of the list of supported antenna port group combinations are operable simultaneously for communication between the device and the network.

In various embodiments, a first antenna port group of the plurality of antenna port groups is part of a first antenna panel, and a second antenna port group of the plurality of antenna port groups is part of a second antenna panel, and the first antenna panel is different from the second antenna panel.

In one embodiment, a first subset of the plurality of antenna port groups comprises receive-capable antenna port groups and a second subset of the plurality of antenna port groups comprises transmit-capable antenna port groups.

In certain embodiments, a first antenna port group of the plurality of antenna port groups is a transmit-capable and receive-capable antenna port group, and the device capability information further comprises beam correspondence capability information for the first antenna port group.

In some embodiments, a second antenna port group of the plurality of antenna port groups is a receive-only capable antenna port group, the second antenna port group is different from the first antenna port group, and wherein the method further comprises: receiving a reference signal on the second antenna port group; determining a path loss estimate based on the received reference signal; determining a transmit power of an uplink transmission on one or more antenna ports of the first antenna port group based on the determined path loss estimate and an offset term, wherein the offset term is based on a characteristic of the first antenna port group and the second antenna port group; and transmitting the uplink transmission on the one or more antenna ports of the first antenna port group with the determined transmit power.

In various embodiments, the characteristic of the first antenna port group and the second antenna port group comprises a number of antenna elements in the first antenna port group and the second antenna port group, an antenna gain of the first antenna port group and the second antenna port group, or some combination thereof.

In one embodiment, the uplink transmission comprises a power headroom report, the power headroom report includes an indication of the pathloss reference signal received on a different antenna port group than the one or more antenna ports of the first antenna port group used for transmitting the uplink transmission.

In certain embodiments, the method includes: receiving a configuration of a first power-offset value for a first antenna port group of the plurality of antenna port groups, and a second power-offset value for a second antenna port group of the plurality of antenna port groups; receiving a transmit power control accumulation value for an uplink transmission on one or more antenna ports of the first antenna port group; determining a transmit power for the uplink transmission on the one or more antenna ports of the first antenna port group based on the first power-offset value associated with the first antenna port group, and the received transmit power control accumulation value; and transmitting the uplink transmission on the one or more antenna ports of the first antenna port group with the determined transmit power.

In some embodiments, a first antenna port group of the plurality of antenna port groups is associated with a first set of one or more pathloss reference signals, a second antenna port group of the plurality of antenna port groups is associated with a second set of one or more pathloss reference signal, and the first set of pathloss reference signals is different from the second set of pathloss reference signals.

In various embodiments, the method includes: receiving a first set of downlink reference signals corresponding to a first set of network downlink beams on a first antenna port group of the plurality of antenna port groups, and a second set of downlink reference signals corresponding to a second set of network downlink beams on a second antenna port group of the plurality of antenna port groups; determining a first set of device receive beams based on the first antenna port group for receiving the first set of downlink reference signals corresponding to the first set of downlink beams, and a second set of device receive beams based on the second antenna port group for receiving the second set of downlink reference signals corresponding to the second set of downlink beams; identifying a tag index from a set $\{1, 2, \ldots, M\_max\}$ for each downlink beam of the first set of downlink beams and the second set of downlink beams; receiving a beam indication associated to a downlink transmission, wherein the beam indication comprises a first tag index from the set $\{1, 2, \ldots, M\_max\}$ associated with the first antenna port group, and a second tag index from the set $\{1, 2, \ldots, M\_max\}$ associated with the second antenna port group; and receiving downlink transmission based on a first receive beam of the determined first set of receive beams corresponding to a first downlink beam of the first set of downlink beams associated with the first tag index, and on a second receive beam of the determined second set of receive beams corresponding to a second downlink beam of the second set of downlink beams associated with the second tag index.

In one embodiment, the method includes: identifying the tag index based on one of: receiving, from the network, an indication of a tag index mapping for each downlink beam of the first set of downlink beams and the second set of downlink beams; and determining, by the device, the tag index and indicating to the network a tag index mapping for each downlink beam of the first set of downlink beams and the second set of downlink beams.

In certain embodiments, the method includes: receiving a plurality of downlink reference signals corresponding to a plurality of downlink beams on the first antenna port group and the second antenna port group; determining beam quality measurements for the plurality of downlink beams based on the received plurality of downlink reference signals; determining the first set of downlink reference signals from the plurality of downlink beams on the first antenna port group based on the determined beam quality measurements and a first beam quality criteria; and determining the second set of downlink reference signals from the plurality of downlink beams on the second antenna port group based on the determined beam quality measurements and a second beam quality criteria.

In some embodiments, a value for M_max is based on a size of the first set of downlink reference signals, a size of the second set of downlink reference signals, or some combination thereof.

In one embodiment, an apparatus includes: a processor that operates the apparatus with a plurality of antenna port groups for communication between the apparatus and a network; and a transmitter that transmits device capability information to the network, wherein the device capability information comprises a number of antenna port groups of the plurality of antenna port groups, a number of antenna ports for each of the antenna port groups, a maximum number of supported spatial layers for each of the antenna port groups, or some combination thereof.

In certain embodiments, the device capability information further comprises a list of supported antenna port group combinations, a maximum number of supported spatial layers for each antenna port group combination of the list of supported antenna port group combinations, or some combination thereof.

In some embodiments, a first antenna port group of a first supported antenna port group combination of the list of supported antenna port group combinations and a second antenna port group of the first supported antenna port group combination of the list of supported antenna port group combinations are operable simultaneously for communication between the apparatus and the network.

In various embodiments, a first antenna port group of the plurality of antenna port groups is part of a first antenna panel, and a second antenna port group of the plurality of antenna port groups is part of a second antenna panel, and the first antenna panel is different from the second antenna panel.

In one embodiment, a first subset of the plurality of antenna port groups comprises receive-capable antenna port groups and a second subset of the plurality of antenna port groups comprises transmit-capable antenna port groups.

In certain embodiments, a first antenna port group of the plurality of antenna port groups is a transmit-capable and receive-capable antenna port group, and the device capability information further comprises beam correspondence capability information for the first antenna port group.

In some embodiments, a second antenna port group of the plurality of antenna port groups is a receive-only capable antenna port group, the second antenna port group is different from the first antenna port group, and wherein the method further comprises: receiving a reference signal on the second antenna port group; determining a path loss estimate based on the received reference signal; determining a transmit power of an uplink transmission on one or more antenna ports of the first antenna port group based on the determined path loss estimate and an offset term, wherein the offset term is based on a characteristic of the first antenna port group and the second antenna port group; and transmitting the uplink transmission on the one or more antenna ports of the first antenna port group with the determined transmit power.

In various embodiments, the characteristic of the first antenna port group and the second antenna port group comprises a number of antenna elements in the first antenna port group and the second antenna port group, an antenna gain of the first antenna port group and the second antenna port group, or some combination thereof.

In one embodiment, the uplink transmission comprises a power headroom report, the power headroom report includes an indication of the pathloss reference signal received on a different antenna port group than the one or more antenna ports of the first antenna port group used for transmitting the uplink transmission.

In certain embodiments, the apparatus includes a receiver, wherein: the receiver: receives a configuration of a first power-offset value for a first antenna port group of the plurality of antenna port groups, and a second power-offset value for a second antenna port group of the plurality of antenna port groups; receives a transmit power control accumulation value for an uplink transmission on one or more antenna ports of the first antenna port group; the processor determines a transmit power for the uplink transmission on the one or more antenna ports of the first antenna port group based on the first power-offset value associated with the first antenna port group, and the received transmit power control accumulation value; and the transmitter transmits the uplink transmission on the one or more antenna ports of the first antenna port group with the determined transmit power.

In some embodiments, a first antenna port group of the plurality of antenna port groups is associated with a first set of one or more pathloss reference signals, a second antenna port group of the plurality of antenna port groups is associated with a second set of one or more pathloss reference signal, and the first set of pathloss reference signals is different from the second set of pathloss reference signals.

In various embodiments, the apparatus comprises a receiver, wherein: the receiver receives a first set of downlink reference signals corresponding to a first set of network downlink beams on a first antenna port group of the plurality of antenna port groups, and a second set of downlink reference signals corresponding to a second set of network downlink beams on a second antenna port group of the plurality of antenna port groups; the processor: determines a first set of device receive beams based on the first antenna port group for receiving the first set of downlink reference signals corresponding to the first set of downlink beams, and a second set of device receive beams based on the second antenna port group for receiving the second set of downlink reference signals corresponding to the second set of downlink beams; and determines a tag index from a set $\{1, 2, \ldots, M\_max\}$ for each downlink beam of the first set of downlink beams and the second set of downlink beams; and the receiver: receives a beam indication associated to a downlink transmission, wherein the beam indication comprises a first tag index from the set $\{1, 2, \ldots, M\_max\}$ associated with the first antenna port group, and a second tag index from the set $\{1, 2, \ldots, M\_max\}$ associated with the second antenna port group; and receives downlink transmission based on a first receive beam of the determined first set of receive beams corresponding to a first downlink beam of the first set of downlink beams associated with the first tag index, and on a second receive beam of the determined second set of receive beams corresponding to a second downlink beam of the second set of downlink beams associated with the second tag index.

In one embodiment, wherein the processor: identifies the tag index based on one of: receiving, from the network, an indication of a tag index mapping for each downlink beam of the first set of downlink beams and the second set of downlink beams; and determining, by the apparatus, the tag index and indicating to the network a tag index mapping for each downlink beam of the first set of downlink beams and the second set of downlink beams.

In some embodiments, wherein: the receiver receives a plurality of downlink reference signals corresponding to a plurality of downlink beams on the first antenna port group and the second antenna port group; and the processor: determines beam quality measurements for the plurality of downlink beams based on the received plurality of downlink reference signals; determines the first set of downlink reference signals from the plurality of downlink beams on the first antenna port group based on the determined beam quality measurements and a first beam quality criteria; and determines the second set of downlink reference signals from the plurality of downlink beams on the second antenna port group based on the determined beam quality measurements and a second beam quality criteria.

In certain embodiments, a value for M_max is based on a size of the first set of downlink reference signals, a size of the second set of downlink reference signals, or some combination thereof.

In one embodiment, a method comprises: receiving a first SR (scheduling request) PUCCH (Physical Uplink Control Channel) resource configuration and a second SR PUCCH resource configuration associated with a logical channel, the first SR PUCCH resource configuration configuring a first PUCCH resource, and the second SR PUCCH resource configuration configuring a second PUCCH resource; triggering a SR for the logical channel; determining a PUCCH resource for transmitting the SR between the first PUCCH resource and second PUCCH resource based on transmission time occasion of the first PUCCH resource and the second PUCCH resource; and transmitting the SR on the determined PUCCH resource.

In certain embodiments, the method comprises: determining the first PUCCH resource for transmitting the SR wherein the transmission time occasion of the first PUCCH resource is earlier than the transmission time occasion of the second PUCCH resource following the triggering of the SR; and transmitting the SR on the determined first PUCCH resource.

In some embodiments, the method comprises: receiving an indication of a priority between the first PUCCH resource and second PUCCH resource for transmitting the SR, wherein the transmission time occasion of the first PUCCH resource and the transmission time occasion of the second PUCCH resource occur in a slot following the triggering of the SR; determining the PUCCH resource for transmitting the SR based on the indicated priority; and transmitting the SR on the determined PUCCH resource.

In various embodiments, the first PUCCH resource has a duration shorter than the duration of the second PUCCH resource.

In one embodiment, the first PUCCH resource has a duration shorter than the duration of the second PUCCH resource.

In one embodiment, an apparatus comprises: a receiver that receives a first SR (scheduling request) PUCCH (Physical Uplink Control Channel) resource configuration and a second SR PUCCH resource configuration associated with a logical channel, the first SR PUCCH resource configuration configuring a first PUCCH resource, and the second SR PUCCH resource configuration configuring a second PUCCH resource; a processor that: triggers a SR for the logical channel; and determines a PUCCH resource for transmitting the SR between the first PUCCH resource and second PUCCH resource based on transmission time occasion of the first PUCCH resource and the second PUCCH resource; and a transmitter that transmits the SR on the determined PUCCH resource.

In certain embodiments, wherein: the processor determines the first PUCCH resource for transmitting the SR wherein the transmission time occasion of the first PUCCH resource is earlier than the transmission time occasion of the second PUCCH resource following the triggering of the SR; and the transmitter transmits the SR on the determined first PUCCH resource.

In some embodiments, wherein: the receiver receives an indication of a priority between the first PUCCH resource and second PUCCH resource for transmitting the SR, wherein the transmission time occasion of the first PUCCH resource and the transmission time occasion of the second PUCCH resource occur in a slot following the triggering of the SR; the processor determines the PUCCH resource for transmitting the SR based on the indicated priority; and the transmitter transmits the SR on the determined PUCCH resource.

In various embodiments, the first PUCCH resource has a duration shorter than the duration of the second PUCCH resource.

In one embodiment, the first PUCCH resource has a duration shorter than the duration of the second PUCCH resource.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving information indicating a first pair of threshold values of a plurality of pairs of threshold values;
   associating the plurality of pairs of threshold values with a plurality of link failure causes;
   measuring a first set of reference signals;
   assessing a radio link quality based on the measurement of the first set of reference signals and the first pair of threshold values;
   determining a link failure based on the radio link quality; and
   transmitting a message including an indication of a link failure cause of the plurality of link failure causes, wherein the link failure cause is associated with the first pair of threshold values.

2. The method of claim 1, wherein the plurality of pairs of threshold values are predefined.

3. The method of claim 1, wherein the first pair of threshold values comprises an in-sync threshold value and an out-of-sync threshold value.

4. The method of claim 1, wherein measuring the first set of reference signals comprises measuring the first set of reference signals for radio link monitoring, and the link failure comprises a radio link failure.

5. The method of claim 4, further comprising receiving a request to report user equipment information, wherein:
   transmitting the message comprises transmitting a user equipment information response message in response to reception of the request;
   the indication of the link failure cause included in the user equipment information response message is an indication of a radio link failure cause; and
   the radio link failure cause is associated with the first pair of threshold values.

6. The method of claim 4, further comprising:
   initiating a radio link failure timer based on a result from measuring the first set of reference signals, wherein the radio link failure is determined in response to expiration of the radio link failure timer; and
   stopping the radio link failure timer in response to reception of an indication of a second set of reference signals for radio link monitoring.

7. The method of claim 1, wherein the first set of reference signals comprises a non-zero transmit power channel state information-reference signal, a synchronization signal and physical broadcast channel block, or some combination thereof.

8. The method of claim 1, wherein the first set of reference signals is associated with a set of downlink antenna ports, and the set of downlink antenna ports is associated with a set of serving physical downlink control channels.

9. The method of claim 1, wherein a subset of the first set of reference signals is configured for radio link monitoring and beam failure detection.

10. The method of claim 1, wherein measuring the first set of reference signals comprises measuring the first set of reference signals for beam failure detection, and the link failure comprises a beam failure.

11. The method of claim 10, further comprising:
    transmitting a beam failure recovery request in response to determining the beam failure; and
    receiving a response to the beam failure recovery request.

12. The method of claim 11, wherein the beam failure recovery request is transmitted on a physical uplink control channel resource.

13. The method of claim 11, wherein the beam failure recovery request is transmitted on a physical random access channel resource.

14. The method of claim 1, wherein the radio link quality is a first radio link quality and the link failure is a first link failure, and the method further comprises:
    assessing a second radio link quality based on the measurement and a second pair of threshold values; and
    determining a second link failure based on the second radio link quality,
    wherein the link failure cause is associated with the first pair of threshold values and the second pair of threshold values.

15. An apparatus comprising:
    a receiver that receives information indicating a first pair of threshold values of a plurality of pairs of threshold values;
    a processor that:
       associates the plurality of pairs of threshold values with a plurality of link failure causes;
       measures a first set of reference signals;
       assesses a radio link quality based on the measurement of the first set of reference signals and the first pair of threshold values; and
       determines a link failure based on the radio link quality; and
    a transmitter that transmits a message including an indication of a link failure cause of the plurality of link failure causes, wherein the link failure cause is associated with the first pair of threshold values.

16. The apparatus of claim 15, wherein the plurality of pairs of threshold values are predefined.

17. The apparatus of claim 15, wherein the first pair of threshold values comprises an in-sync threshold value and an out-of-sync threshold value.

18. The apparatus of claim 15, wherein the processor measuring the first set of reference signals comprises the processor measuring the first set of reference signals for radio link monitoring, and the link failure comprises a radio link failure.

19. The apparatus of claim 18, wherein the receiver receives a request to report user equipment information, wherein:
- the transmitter transmitting the message comprises the transmitter transmitting a user equipment information response message in response to reception of the request;
- the indication of the link failure cause included in the user equipment information response message is an indication of a radio link failure cause; and
- the radio link failure cause is associated with the first pair of threshold values.

20. The apparatus of claim 18, wherein the processor:
- initiates a radio link failure timer based on a result from measuring the first set of reference signals, wherein the radio link failure is determined in response to expiration of the radio link failure timer; and
- stops the radio link failure timer in response to reception of an indication of a second set of reference signals for radio link monitoring.

* * * * *